(12) United States Patent
Singh et al.

(10) Patent No.: US 11,301,049 B2
(45) Date of Patent: Apr. 12, 2022

(54) USER INTERFACE CONTROL BASED ON ELBOW-ANCHORED ARM GESTURES

(71) Applicants: Gaganpreet Singh, Markham (CA); Rafael Veras Guimaraes, North York (CA); Wei Zhou, Richmond Hill (CA); Pourang Polad Irani, Winnipeg (CA); Farzin Farhadi-Niaki, Maple (CA); Wei Li, Markham (CA)

(72) Inventors: Gaganpreet Singh, Markham (CA); Rafael Veras Guimaraes, North York (CA); Wei Zhou, Richmond Hill (CA); Pourang Polad Irani, Winnipeg (CA); Farzin Farhadi-Niaki, Maple (CA); Wei Li, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 24 days.

(21) Appl. No.: 17/024,633

(22) Filed: Sep. 17, 2020

(65) Prior Publication Data
US 2021/0081052 A1  Mar. 18, 2021

Related U.S. Application Data

(60) Provisional application No. 62/901,737, filed on Sep. 17, 2019.

(51) Int. Cl.
*G06F 3/01* (2006.01)
*G06K 9/00* (2022.01)
*G06F 17/16* (2006.01)

(52) U.S. Cl.
CPC .......... *G06F 3/017* (2013.01); *G06K 9/00355* (2013.01); *G06F 17/16* (2013.01)

(58) Field of Classification Search
CPC ...... G06F 3/017; G06F 3/011; G06F 3/04842; G06F 3/04815; G06F 17/16; G06K 9/00355
See application file for complete search history.

(56) References Cited

U.S. PATENT DOCUMENTS

2009/0228841 A1  9/2009 Hildreth
2010/0235786 A1* 9/2010 Maizels .................. G06F 3/011
                                                  715/810

(Continued)

OTHER PUBLICATIONS

Yuanhao Wu et al., Natural Gesture Modeling and Recognition Approach Based on Join Movements and Arm Orientation, Aug. 10, 2016, IEEE Sensors Journal, vol. 16, No. 21, pp. 7753-7755 (Year: 2016).*

(Continued)

*Primary Examiner* — Tam T Tran

(57) ABSTRACT

User interface control based on elbow-anchored arm gestures is disclosed. In one aspect, there is provided a method of user interface control on a computing device based on elbow-anchored arm gestures. A visual user interface (VUI) screen is displayed on a display of a computing device. The VUI screen comprises a plurality of VUI elements arranged in a plurality of VUI element levels. Each VUI element level comprising one or more VUI elements. A spatial location of an elbow of an arm of a user and a spatial location of a wrist of the arm of the user are determined. A three-dimensional (3D) arm vector extending from the spatial location of the elbow to the spatial location of the wrist is then determined. A VUI element in the VUI screen corresponding to the 3D arm vector is then determined based on a predetermined 3D spatial mapping between 3D arm vectors and VUI elements for the VUI screen.

20 Claims, 16 Drawing Sheets

(56) References Cited

U.S. PATENT DOCUMENTS

2011/0199291 A1* 8/2011 Tossell .................... G06F 3/017
                                                          345/156
2011/0289455 A1  11/2011 Reville et al.
2014/0046922 A1   2/2014 Crook et al.
2019/0073112 A1*  3/2019 Holz ..................... G06F 3/0485

OTHER PUBLICATIONS

Muhammad Fuad et al., Skeleton Based Gesture to Control Manipulator, Jul. 8, 2016, ICAMIMIA2015, pp. 1-6 (Year: 2016).*

Bailly, G., et al. Comparing Free Hand Menu Techniques for Distant Displays Using Linear, Marking and Finger-Count Menus. Human-Computer Interaction—INTERACT 2011. P. Campos, et al., eds. Springer Berlin Heidelberg 2011.

Chattopadhyay, D. and Bolchini, D. Touchless circular menus: toward an intuitive UI for touchless interactions with large displays. Proceedings of the 2014 International Working Conference on Advanced Visual Interfaces—AVI '14 (Como, Italy, 2014) 2014.

Freeman, W.T. and Weissman, C.D. Television control by hand gestures. International Workshop on Automatic Face and Gesture Recognition 1995.

Darren Guinness, Alvin Jude, Gene Michael Poor and Ashley Dover, Models for Rested Touchless Gestural nteraction, Publication: SUI '15: Proceedings of the 3rd ACM Symposium on Spatial User Interaction, https://doi.org/10.1145/2788940.2788948 Aug. 2015.

Darren Guinness, Andrew Seung, Ashley Dover, Gene Michael Poor and Alvin Jude, Modeling Mid-air Gestures With Spherical Coordinates, Publication: SUI '15: Proceedings of the 3rd ACM Symposium on Spatial User Interaction Aug. 2015.

Dustin Freeman, Ramadevi Vennelakanti and Sriganesh Madhvanath, Freehand pose-based Gestural Interaction Studies and implications for interface design, Publication: IEEE Proceedings of 4th International Conference on Intelligent Human Computer Interaction (IHCI) Dec. 2012.

* cited by examiner

USER INTERFACE CONTROL BASED ON ELBOW-ANCHORED ARM GESTURES

RELATED APPLICATION DATA

The present application claims priority to provisional U.S. patent application No. 62/901,737, filed Sep. 17, 2019, the content of which is incorporated herein by reference.

TECHNICAL FIELD

The present disclosure relates generally to user interfaces and, more specifically, to user interface control based on body gestures.

BACKGROUND

User interfaces (UIs) based on body gestures often require users to hold rigid body postures to interact with UI, for example, via mid-air arm interactions. Such postures are impractical in a number of settings, including when sitting relaxed in front of a smart TV, when casually interacting with a system at a distance, or when the user's hands are encumbered. In addition, the performance of mid-air arm interactions may lead to arm fatigue. Accordingly, there exists a need for improvements in user interface controls based on body gestures.

SUMMARY

The present disclosure provides a user interface control based on elbow-anchored arm gestures. Elbow-anchored arm gestures are gestures that primarily involve the forearm (shoulder rotation and elbow flexion/extension) and may be contrasted with full arm gestures. Elbow-anchored arm gestures may be more flexible and which reduce or avoid arm fatigue. In conventional mid-air arms interactions, multiple body parts are involved and the shoulder movement largely dominates the forces required for moving the arm when perform mid-air arm interactions. Therefore, for reducing arm fatigue when performing mid-air arm interactions, it is desirable to limit the shoulder motion. Known solutions do not consider this biomechanical and ergonomic aspect of mid-air arm interactions and required intensive shoulder muscle movement.

The present disclosure provides methods of user interface control based on elbow-anchored arm gestures. The method includes determining a three-dimensional arm vector based on the spatial location of an elbow of an arm of a user and the spatial location of a wrist of the arm of the user. The determined three-dimensional arm vector is compared and matched to a corresponding elbow-anchored arm gesture. An executable action mapped to the matching elbow-anchored arm gesture is determined and the determined executable action may be performed. The methods are used to control or interact with a user interface including, but not limited to, a visual user interface (VUI) and VUI elements of VUIs.

The methods and VUIs of the present disclosure are based primarily on detecting elbow-anchored arm gestures in an interaction space centered on the user's elbow joint and forearm position and/or motion to accommodate a range of body postures including arm positions. This reduces or eliminates the constraints on body posture associated with conventional mid-air interactions, reduces arm fatigue by reducing shoulder involvement, and reduces the effect of gorilla arm syndrome caused by conventional mid-air interactions. As noted above, known solutions do not consider this biomechanical aspect of the mid-air arm interactions and required intensive shoulder muscle movement. The present inventors have recognized that among the three arm joints, users commonly engage the elbow and wrist when asked to perform mid-air arm interactions. FIG. 14 illustrates the result of an observational study and shows that a dominant use of elbow and wrist joints, as compared to the shoulder joint, motions, when users are given free choice to perform mid-air arm interactions, such as mid-air arm gestures.

The present disclosure also provides complimentary VUIs having a screen configuration and interactions that support the methods of the present disclosure. The VUI screen configurations and interactions are based on elbow-anchored arm gestures determined based on the three-dimensional arm vector with VUI screens configured along a line, such as an arc, formed by arm movement centered at the elbow, i.e. forearm movement. The VUI screen configuration and interactions may allow more options than known mid-air VUI screen configurations. The VUI screens comprise a plurality of VUI elements arranged in a plurality of VUI element levels, each VUI element level comprising one or more VUI elements. A forward inclination angle between the three-dimensional arm vector and a horizontal reference plane typically controls the VUI element level that is selected, and a lateral inclination angle between the three-dimensional arm vector and a vertical reference plane typically controls the VUI element on the VUI element level that is selected.

The VUI screen configurations are scalable to include more VUI elements by increasing VUI elements along the horizontal reference plane. Upper levels of the VUI screens relative to a screen orientation of the VUI may have smaller interaction space as compared to the lower levels of the VUI screens relative to a screen orientation of the VUI based on the biomechanical and ergonomic aspects, therefore upper VUI levels may have fewer VUI elements requiring less horizontal motion as compared to the lower levels. This also helps reduce the false positives due to the natural arm movement. The VUI screen configurations may also accommodate asymmetries that are known to be latent in arm movements. For example, the forearm side of the VUI screen may have more VUI elements as a result of increased interaction space compared to the upper arm side.

In accordance with a first embodiment of a first aspect of the present disclosure, there is provided a method of user interface control based on elbow-anchored arm gestures. A visual user interface (VUI) screen is displayed on a display of a computing device. The VUI screen comprises a plurality of VUI elements arranged in a plurality of VUI element levels. Each VUI element level comprising one or more VUI elements. A spatial location of an elbow of an arm of a user and a spatial location of a wrist of the arm of the user are determined based on sensor data. A three-dimensional (3D) arm vector extending from the spatial location of the elbow to the spatial location of the wrist is then determined. A VUI element in the VUI screen corresponding to the 3D arm vector is then determined based on a predetermined 3D spatial mapping between 3D arm vectors and VUI elements for the VUI screen.

In some or all examples of the first embodiment of the first aspect, determining the VUI element in the VUI screen corresponding to the 3D arm vector comprises determining a forward inclination angle formed between the 3D arm vector and a horizontal reference plane, and determining a lateral inclination angle formed between the 3D arm vector and a vertical reference plane, and determining a VUI element in the VUI screen based on the forward inclination angle and the lateral inclination angle.

In some or all examples of the first embodiment of the first aspect, determining the VUI element in the VUI screen comprises determining a corresponding VUI element level of the VUI screen among the plurality of VUI element levels of the VUI screen based on the forward inclination angle, determining a corresponding VUI element in the determined VUI element level of the VUI screen based on the lateral inclination angle.

In some or all examples of the first embodiment of the first aspect, the method further comprises, prior to causing the VUI screen to be displayed and in response to input to display the VUI screen, determining a spatial location of an elbow of an arm of a user, determining a spatial location of a wrist of the arm of the user, determining a 3D arm vector extending from the spatial location of the elbow to the spatial location of the wrist, determining an offset angle between the 3D arm vector and a vertical centerline from the spatial location of the elbow, and generating the VUI screen offset from the centerline of the display of the computing device in response to a determination that the offset angle is greater than or equal to a threshold offset angle.

In some or all examples of the first embodiment of the first aspect, upper VUI element levels in VUI screen relative to a screen orientation of the VUI screen have fewer VUI elements than lower VUI element levels in VUI screen relative to a screen orientation of the VUI screen.

In some or all examples of the first embodiment of the first aspect, the plurality of VUI elements are arranged in spherical grid.

In some or all examples of the first embodiment of the first aspect, the method further comprises, selecting the determined VUI element, and visually emphasizing the selected VUI element.

In some or all examples of the first embodiment of the first aspect, the method further comprises, performing an executable action corresponding to the selected VUI element in response to the detection of confirmation input.

In some or all examples of the first embodiment of the first aspect, the confirmation input is a designated hand gesture.

In some or all examples of the first embodiment of the first aspect, the method further comprises performing an executable action corresponding to the determined VUI element.

In accordance with a second embodiment of the first aspect of the present disclosure, there is provided a method of user interface control on a computing device based on elbow-anchored arm gestures. A spatial location of an elbow of an arm of a user and a spatial location of a wrist of the arm of the user are determined based on sensor data. A three-dimensional (3D) arm vector extending from the spatial location of the elbow to the spatial location of the wrist is then determined. An executable action corresponding to the 3D arm vector is then determined based on a predetermined 3D spatial mapping between 3D arm vectors and executable actions.

In some or all examples of the first embodiment of the first aspect, the method further comprises performing the executable action corresponding to the 3D arm vector.

In accordance with a third embodiment of the first aspect of the present disclosure, there is provided a method of detecting selection of a particular menu item user interface element in a user interface including a plurality of level user interface elements and including a plurality of menu item user interface elements. The method includes causing presentation, on a display, of the user interface, detecting a spatial location of an elbow of an arm of a user, detecting a spatial location of a wrist of the arm of the user and defining a three-dimensional arm vector extending from the spatial location of the elbow to the spatial location of the wrist. The method further includes determining a forward inclination angle formed between the three-dimensional arm vector and a horizon, determining, based on the forward inclination angle, a current level user interface element among the plurality of level user interface elements, detecting a direction for a lateral displacement of the wrist and based on the direction, detecting selection of the particular menu item user interface element, where the particular menu item user interface element is associated with the direction and the current level user interface element.

In accordance with a second aspect of the present disclosure, there is provided a computing device comprising a memory and a processor system comprising at least one processor coupled to the memory. The non-transitory machine-readable medium has tangibly stored thereon executable instructions for execution by the processor system of the computing device. The executable instructions, in response to execution by the processor system, cause the processor system to perform the methods described above and herein.

In accordance with a second aspect of the present disclosure, there is provided a non-transitory machine-readable medium having tangibly stored thereon executable instructions for execution by a processor system of a computing device. The processing system comprising at least one processor, wherein the executable instructions, in response to execution by the processor system, cause the processor system to perform the methods described above and herein.

Other aspects and features of the present disclosure will become apparent to those of ordinary skill in the art upon review of the description of specific implementations of the present disclosure in conjunction with the accompanying figures.

DETAILED DESCRIPTION OF EXAMPLE EMBODIMENTS

Figure 1:
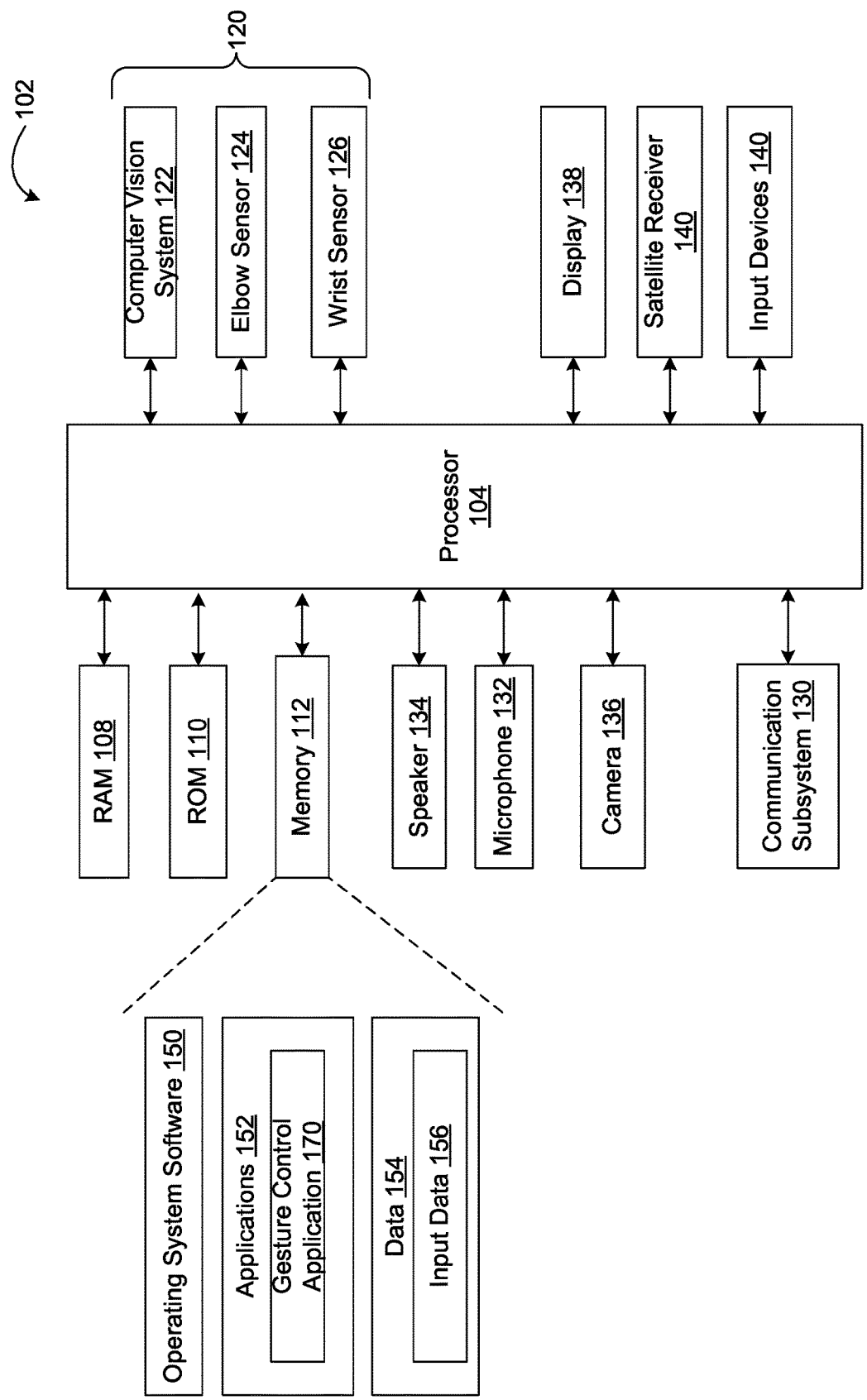
FIG. 1 is a block diagram of a computing device suitable for practicing the teachings of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

The term "gesture" is used in the present disclosure and is intended to include positions as well as movements or motions. The present disclosure also refers to VUI screens.

Reference is first made to FIG. 1 which illustrates a computing device 102 suitable for practicing the teachings of the present disclosure. The computing device 102 may be a multi-purpose or special purpose electronic device. Examples of the computing device 102 include, but are not limited to, a smart TV, a personal computer such as a desktop or laptop computer, a smartphone, tablet, a personal camera or camera peripheral, smart glasses or other head device mounted smart display, a smart speaker or other smart or IoT (Internet of Things) device such as a smart appliance, among other possibilities.

The computing device 102 includes a processing system comprising a processor 104 (such as a microprocessor or central processing unit (CPU)) which controls the overall operation of the computing device 102. The processing system may include one or more other types of processors coupled to the processor 104, such as a graphic processing unit (GPU), a tensor processing unit (TPU), a neural processing unit (NPU), an application specific integrated circuit (ASIC), or a field programmable gate array (FPGA), for off-loading certain computing tasks. The processor 104 is coupled to a plurality of components via a communication bus (not shown) which provides a communication path between the components and the processor 104. The processor 104 is coupled to Random Access Memory (RAM) 108, Read Only Memory (ROM) 110, and persistent (non-volatile) memory 112 such as flash memory and a communication subsystem 130. The communication subsystem 130 includes one or more wireless transceivers for exchanging radio frequency signals with wireless networks. The communication subsystem 130 may also include a wireline transceiver for wireline communications with wired networks. The wireless transceivers may include one or a combination of Bluetooth transceiver or other short-range wireless transceiver, a Wi-Fi or other wireless local area network (WLAN) transceiver for communicating with a WLAN via a WLAN access point (AP), or a wireless wide area network (WWAN) transceiver such as a cellular transceiver for communicating with a radio access network (e.g., cellular network). The cellular transceiver may communicate with any one of a plurality of fixed transceiver base stations of the cellular network within its geographic coverage area. The wireless transceivers may include a multi-band cellular transceiver that supports multiple radio frequency bands. Other types of short-range wireless communication include near field communication (NFC), IEEE 802.15.3a (also referred to as UltraWideband (UWB)), Z-Wave, ZigBee, ANT/ANT+ or infrared (e.g., Infrared Data Association (IrDA) communication). The wireless transceivers may include a satellite receiver for receiving satellite signals from a satellite network that includes a plurality of satellites which are part of a global or regional satellite navigation system.

The computing device 102 also comprises a display 138 coupled to the processor 104. The display 138 may be implemented as a conventional display screen. However, there are many alternative manners in which to provide visual feedback to the user. In the context of augmented reality and/or virtual reality visual feedback mechanisms, visual feedback may be provided through projection on the user's retina. Furthermore, the computing device 102 may arrange the display 138 as a projection onto a surface.

The computing device 102 may also comprise sensor in the form a camera 136 and a detection and ranging (DAR) unit 122 such as a LiDAR unit. The computing device 102 may also comprise a microphone 132, a speaker 134, and a satellite receiver 140 for receiving satellite signals from a satellite network each coupled to the processor 104, depending on the type of the computing device 102. The computing device 102 may also comprise one or more other input devices 142 such as a touchscreen, keyboard, keypad, navigation tool, buttons, switches or dials depending on the type of the computing device 102. A touchscreen may be provided as the display 138.

The computing device 102 may also comprise a plurality of additional sensors 120 coupled to the processor 104. The sensors 120 may comprise an accelerometer, a motion sensor, a gyroscope, an inertial measurement unit (IMU), a proximity sensor, an orientation sensor, electronic compass or altimeter, among other possibilities.

A computer vision system may be provided by the camera 136 and/or a DAR unit 122 in combination with a computer vision application 172. The computer vision system may be based on one or a combination of images from the camera 136 and point cloud positional data from the DAR unit 122. The computer vision system is configured to detect the body position of a user, including a spatial location of an elbow of an arm of the user and a spatial location of a wrist of the arm of the user. In one embodiment, the camera captures a video of a user performing elbow-anchored gestures and determines the three-dimensional arm vector and optionally a type of elbow-anchored gesture performed using known image processing techniques. The computer vision system receives images of the user's arm and hand and processes the images using known image processing techniques to detect the location of the elbow and wrist, and determine the three-dimensional arm vector and track the three-dimensional arm vector across frames to determine that an elbow-anchored gesture was performed. In some embodiments, the computer vision system determines three-dimensional coordinates of the two relevant body joints (i.e., elbow and wrist). From the three-dimensional coordinates, an arm length is derived, and azimuth and inclination are determined based on conversion equations known in the art. From the azimuth and inclination, the arm length may be mapped to x and y coordinates of a VUI displayed on the display 138 using a linear mapping equation known in the art.

Alternatively, the computing device 102 may be wirelessly coupled to a smart device 200 via the communication subsystem 130 that comprises one or more dedicated sensors configured to detect a spatial location of an elbow of an arm of a user (referred to as "elbow sensors" 124) such as an acceleration sensor (e.g., accelerometer) and gyroscope, and one or more dedicated sensors configured to detect a spatial location of a wrist of the arm of the user (referred to as "wrist sensors" 126) such as an acceleration sensor (e.g., accelerometer) and gyroscope. In some embodiments, the smart device 200 is a wearable device such as a glove, sleeve, band or similar garment to be worn by the user, and the elbow sensors 124 and wrist sensors 126 are embedded therein. In other embodiments, the smart device 200 comprises a smart watch comprising an accelerometer and gyroscope worn by a user at their wrist and an accelerometer and gyroscope are carried by a separate sensor module (not shown) at the elbow of the user which wirelessly communicates with the smart device 200. The wrist sensors 126 and elbow sensors 124 of the smart device 200 capture the acceleration and rotation of the wrist and elbow and transmit signals indicative of acceleration and rotation of the user's wrist and elbow to computing device 102 via the communication subsystem 130 via Bluetooth™ or other suitable wireless communication protocol. In yet other embodiments, a single sensor at the wrist in a smart watch or the like may be used. In such embodiments, the elbow and wrist location are not known. An orientation of the sensor and the smart watch relative to an arbitrary origin. It is assumed that the orientation of the watch is the same orientation of the arm and the elbow is at rest on an arm rest or the like and static during interaction. A calibration may be performed during an initial setup. In all embodiments, the computing device 102 processes the signals to determine the three-dimensional arm vector mentioned above.

Operating system software 150 executable by the processing system, including the processor 104 is stored in the persistent memory 112 but may be stored in other types of memory devices, such as ROM 108 or similar storage element. The operating system software 150 renders a VUI for user interaction on the display 138 of the computing device 102. A user may interact with the VUI elements rendered on the display 138 via elbow-anchored gestures and/or input devices 142 as described in further detail below. A number of application programs 152 executable by the processing system, including the processor 104 are also stored in the persistent memory 112. The application programs 152 comprises a gesture control application 170 and a computer vision application 172. Alternatively, the gesture control application 170 and computer vision application 172 may be part of the operating system software 150, such as part of the VUI, or an application programming interface (API). The gesture control application 170 comprises instructions for user interface control based on elbow-anchored arm gestures in accordance with the teachings of the present disclosure, such as the methods 600 and 700 described below.

The memory 112 stores a variety of data 154, including sensor data acquired by the plurality of sensors 120, including sensor data acquired by the sensors 120. The memory 112 also stores input data 156 acquired by the display 138 and/or other input devices 142, user data including user preferences, settings and possibly biometric data about the user for authentication and/or identification, a download cache including data downloaded via the wireless transceivers, and saved files. System software, software modules, specific device applications, or parts thereof, may be temporarily loaded into RAM 108. Communication signals received by the computing device 102 may also be stored in RAM 108. Although specific functions are described for various types of memory, this is merely one embodiment, and a different assignment of functions to types of memory may be used in other embodiments.

The computing device 102 may also comprise a battery (not shown) as a power source, such as one or more rechargeable batteries that may be charged, for example, through charging circuitry coupled to a battery interface such as the serial data port. The battery provides electrical power to at least some of the components of the computing device 102, and the battery interface (not shown) provides a mechanical and electrical connection for the battery. Alternatively, an AC power source may be provided.

Figure 2:
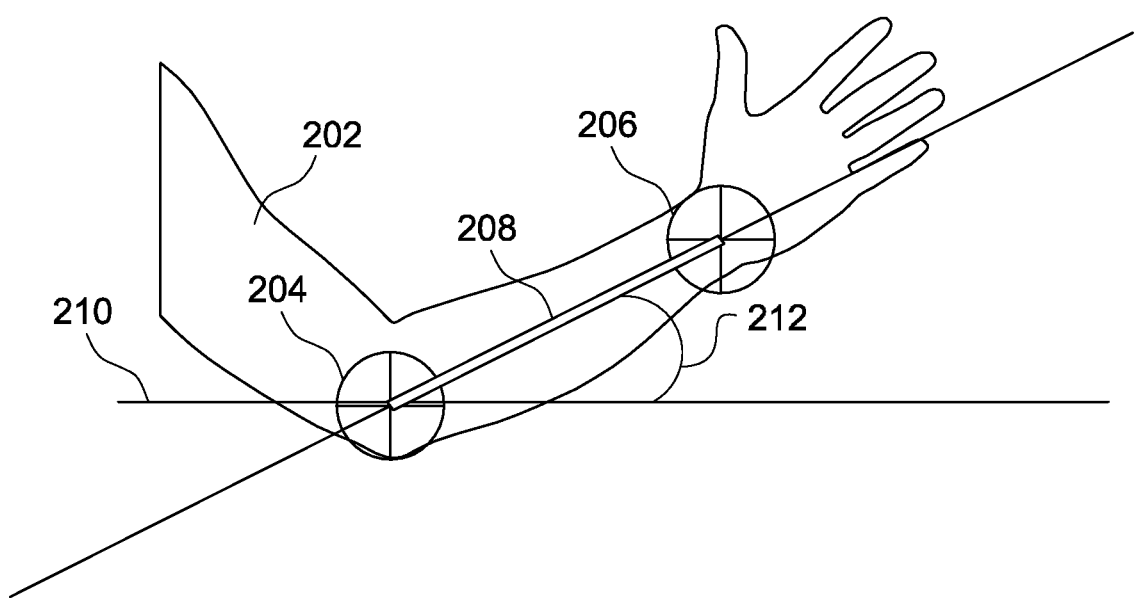
FIG. 2 illustrates an arm of a user, which may be detected by sensors of the computing device in FIG. 1 in accordance with the present disclosure.

FIG. 2 illustrates an arm 202 of a user. The sensors 120 of the computing device 102 may detect a spatial location 204 of an elbow of the arm 202 and a spatial location 206 of a wrist of the arm 202. The spatial location 204 of the elbow and the spatial location 206 of the wrist may be understood to define a three-dimensional arm vector 208 extending from the spatial location 204 of the elbow to the spatial location 206 of the wrist. A feature of the three-dimensional arm vector 208 is a forward inclination angle 212, which may be considered to exist between the three-dimensional arm vector 208 and a horizontal reference plane 210. Although the horizontal reference plane 210 is selected here for a reference plane for the forward inclination angle 212, it may be understood that any consistent reference plane may be used.

Figure 3A:
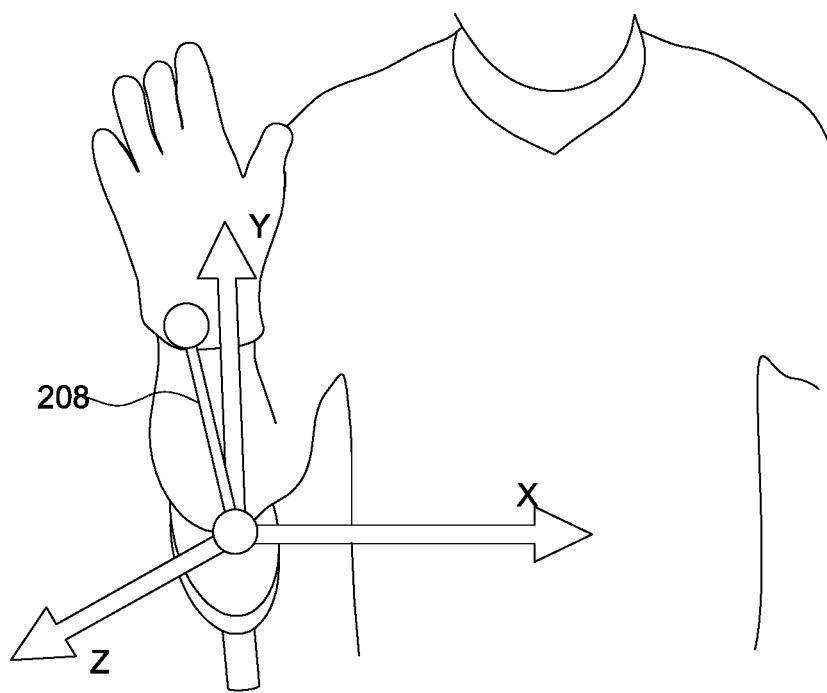
FIGS. 3A and 3B illustrate a three-dimensional arm vector in a three-dimensional space.
Figure 3B:
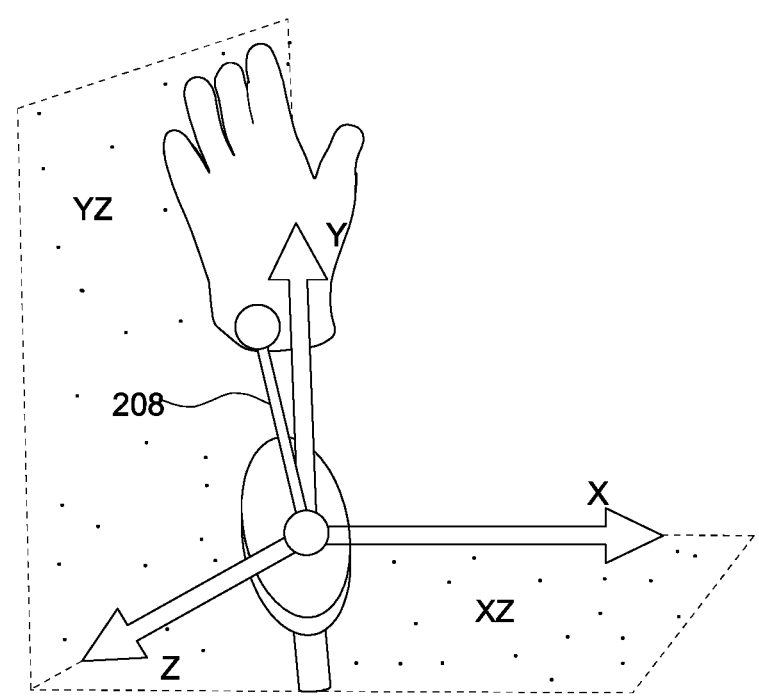

FIGS. 3A and 3B illustrate the three-dimensional arm vector 208 in a three-dimensional space defined X, Y and Z axes. The forward inclination angle 212 is formed between the three-dimensional arm vector 208 and a horizontal reference plane 210 defined by the XZ plane. A lateral inclination angle formed between the three-dimensional arm vector 208 and a vertical reference plane 210 defined by the YZ plane. The YZ plane may be defined by, or coincident with, a vertical centerline of the user's elbow from the spatial location of the elbow. A coordinate system which may either be with reference to the body orientation or the earth is used. The origin of the coordinate system is placed at the elbow joint and the centerline may be defined as the Y axis parallel to the body/earth orientation, as described in more detail below. A user seated in a chair and resting their elbow on a surface (i.e. an arm of a chair) is able to move his or her arm through the XZ plane, YZ plane or a both, even while in a seated position. The user may rest his or her below on an arm rest of a chair, sofa or the like, or any other horizontal surface, while performing elbow-anchored arm gestures and still move his or her arm through one or both of the XZ and YZ planes, thereby avoiding arm fatigue.

Figure 4:
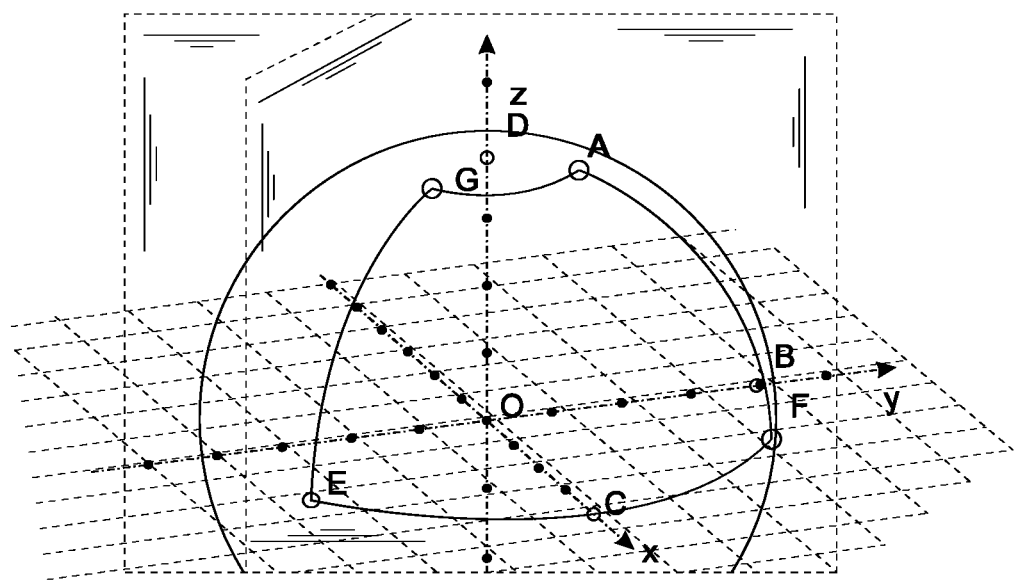
FIG. 4 illustrates the interaction space of the user as a subregion on a sphere with the elbow at the center of the sphere.

Since the distance between the wrist and the elbow joint is always the length of the forearm, the hand motion may be defined by a sphere centered at the elbow joint O with radius the length of the forearm shown in FIG. 4. Only a subsection of the sphere is accessible due to the range of motion of the elbow. To describe regions on the sphere that are reachable (the region bound by the line EGAFCE in FIG. 4), four planes are considered: ODE, ODF, OEF, and the plane that crosses G and A and is perpendicular to z. Without loss of generality, assuming the user is right handed, the plane ODE corresponds to the rightmost limit the user is able to move the hand to, the plane ODF corresponds to the user's chest, which sets the left boundary. In an observational study it was found that participants performed gestures with the hand raised above a certain level, which may be approximated by the plane OEF for consistency and simplicity. On a couch, chair or other seated position, this plane may represent the armrest, for instance.

In this setting, the maximum angle range of the angle EOF of the left-right forearm movement is around 100°, with points E and F being the bottom left and bottom right corners of the input space. The angle range of the angle COD for the up-down movement is around 70° where the point C is on the sphere and bisects angle LEOF. The points G and A are, respectively, the top right and top left corners of the space. A coordinate system may be set that aligns the x-axis with OC and z-axis with OD. This results in angles COE=−60°, COF=40°, and FOA=EOG=70°. This allows any point in the interaction space to be specified by two angles $\theta \in [-60°, 40°]$, and $\phi \in [0°, 70°]$, which are referred to as azimuth and inclination, analogous to the longitude-latitude geographic coordinate system on Earth.

Figure 5:
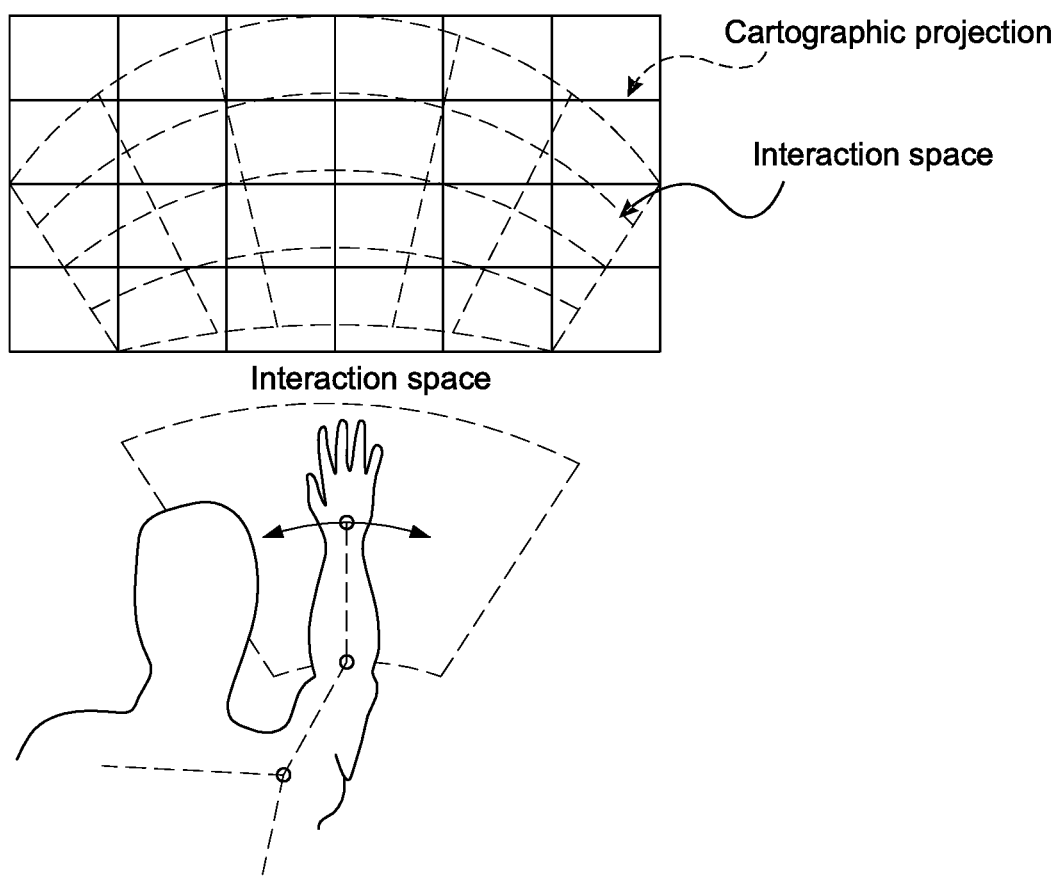
FIG. 5 illustrates the interaction space of the user and a cartographic projection of the interaction space of the user.

The interaction space (also known as motor space) of the user is illustrated in FIG. 5. The interaction space is the three-dimensional space in which the user is able to move his or her arm while the user's elbow is anchored on a surface, such as an arm of a chair, sofa, and the like, based on biomechanics, for example.

For interaction with VUIs, the three-dimensional interaction space of the user is spatially mapped to a two-dimensional plane of the VUI. The three-dimensional interaction space may be projected onto the two-dimensional plane. The projection, referred to as a cartographic projection or map projection, is a representation of all or part of the three-dimensional interaction space in a two-dimensional plane having the same dimension as the display 138. The three-dimensional arm vectors and elbow-anchored arm gestures in three-dimensions detected by the processor 104 may be mapped to VUI elements in two-dimensions using a predetermined spatial mapping between the three-dimensional (3D) elbow-anchored arm gestures and vectors and the two-dimensional (2D) VUI elements. The term "elbow-anchored arm gestures" includes arm positions as well as arm movements.

The interaction space may be based on a user in a seated position in some embodiments, for example, the "reachable" space when the spatial location 204 of the elbow is fixed. If an imaginary sphere is defined with a center at the spatial location 204 of the elbow, the interaction space may be defined as a portion of a surface of the imaginary sphere defined by the limits of lateral forearm motion and vertical forearm motion. The location of elbow joint is center of the sphere and the hand is on the surface of the sphere. The forearm length defines the radius of the sphere in the three-dimensional space.

Figure 9:
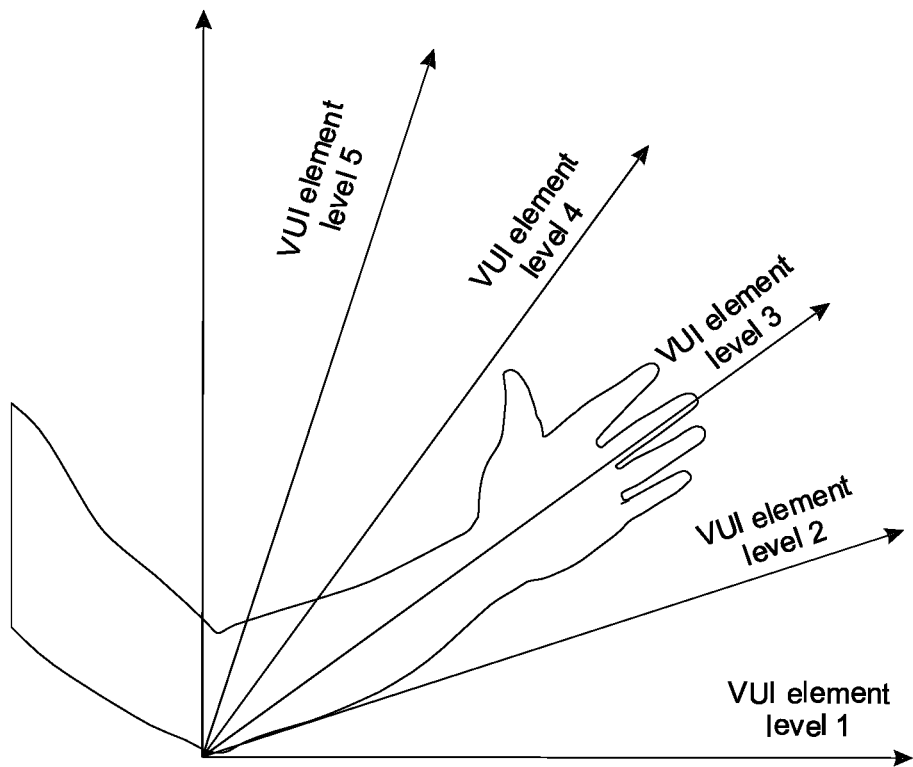
FIG. 9 is a schematic representation illustrating the relationship between the forward inclination angle and VUI element level in accordance with embodiments of the present disclosure.

Mapping the motor space to the VUI may involve the following steps in some embodiments. The spatial location 204 of the elbow and spatial location of the wrist are detected. These define a sphere centered at the spatial location 204 of the elbow with the hand on the surface of the sphere. The body orientation of the user is detected of predefined. The body orientation is used to define three planes indicating the left, right and the bottom boundaries of the interaction space. Each plane contains the center of the sphere. This interaction space is subdivided into vertical levels using planes cutting through the y-axis. These planes are the base XY plane rotated around the y-axis and separated by equal angles. An example of this is shown in FIG. 9. The rotation angle corresponds to the y-coordinate on the display 138 or x-coordinate if the VUI is scrollable. The interaction space is further subdivided by planes parallel to the XZ plane, separated by equal arc length, resulting in cells of similar area and shape. The arc length corresponds to x-coordinate on the display 138. To map any interaction space coordinate (X0, Y0, Z0) to a display coordinate, a rotation angle theta is used, where theta=arctan (Z0/X0) as a y-coordinate on the display 138 and arctan (X0*cos(theta)/Y0). Optionally, 10 degree margins may be provided on each side for easier reachability and better control. Each VUI element in a plurality of VUI elements correspond to a cell in a plurality of cells in the interaction space.

Figure 6:
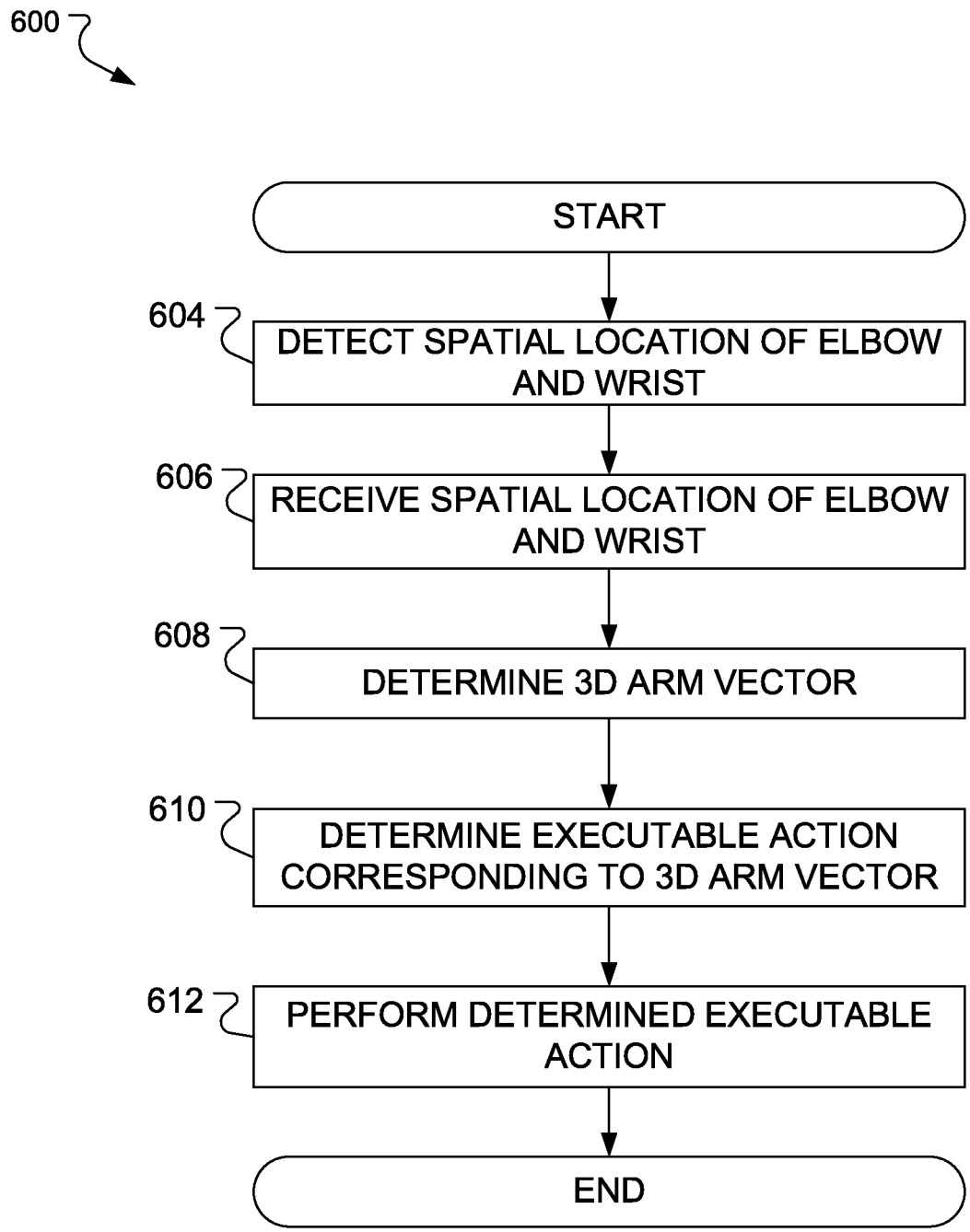
FIG. 6 is a flowchart illustrating a method of user interface control based on elbow-anchored arm gestures in accordance with one embodiment of the present disclosure.

FIG. 6 is a flowchart illustrating a method of user interface control based on elbow-anchored arm gestures in accordance with one embodiment of the present disclosure. The method 600 is used to control or interact with a user interface including, but not limited to, a VUI. The method 600 may be carried out by software such as the gesture control application 170 executed, for example, by at least the processor 104 of the processing system of the computing device 102 illustrated in FIG. 1.

At operation 604, the processor 104 determines a spatial location 204 for the elbow of the arm 202 of the user and a spatial location 206 for the wrist of the arm 202 based on signals received from the wrist sensor 124 and the elbow sensor 126.

At operation 608, the processor 104 determines a three-dimensional arm vector 208 extending from the spatial location 204 of the elbow to the spatial location 206 of the wrist.

At operation 610, the processor 104 determines an executable action corresponding to the three-dimensional arm vector 208 based on a predetermined 3D spatial mapping between three-dimensional arm vectors and executable actions. Alternatively, an executable action may be based on an elbow-anchored arm gesture, for example defined by a trajectory over k past historical locations, rather than a single three-dimensional arm vector.

The executable actions may be any suitable type of executable actions. The particular executable actions may vary based on the type of the computing device 102, the active application or context, among other factors. The type of executable actions which may vary based on the type of UI of the computing device 102. For UI without a VUI component, such as a smart TV controlled by motion gestures, examples of executable actions include "power on", "power off", "increase volume", "decrease volume", "mute", "settings", "home screen", or "start video streaming service", the meaning of which would be understood to persons skilled in the art. For VUIs, the executable action may comprise selection of a VUI element within a VUI screen displayed on the display 138.

At operation 612, the processor 104 causes the determined executable action corresponding to the three-dimensional arm vector 208 to be performed.

Figure 7:
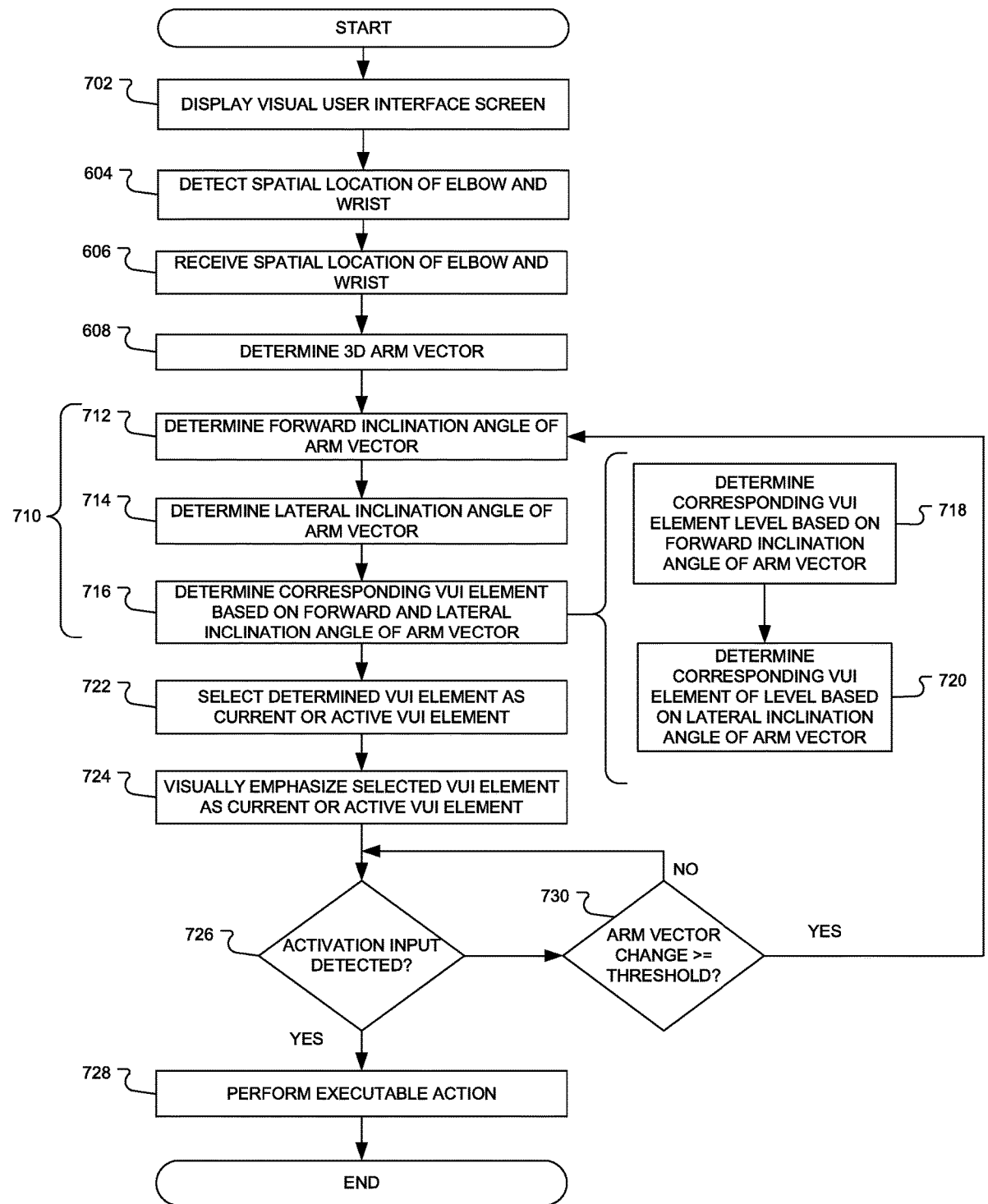
FIG. 7 is a flowchart illustrating a method of user interface control based on elbow-anchored arm gestures in accordance with another embodiment of the present disclosure.

FIG. 7 is a flowchart illustrating a method of user interface control based on elbow-anchored arm gestures in accordance with one embodiment of the present disclosure. The method 700 is used to control or interact with a VUI. The method 700 is similar to the method 600 except that the executable actions in method 700 related to selecting VUI elements in a VUI screen. The method 700 may be carried out by software such as the gesture control application 170 executed, for example, by at least the processor 104 of the processing system of the computing device 102 illustrated in FIG. 1.

At operation 702, the processor 104 causes the display of a VUI screen on the display 138 of the computing device 102. The VUI screen includes a plurality of VUI elements. The plurality of VUI elements are arranged in a plurality of VUI element levels (or rows), with each VUI element level (or merely "level") including one or more VUI elements. Example VUI screen configurations are described below. The processor 104 may cause the display of a VUI screen to be displayed based on input received by the user, such as a voice input received by the microphone 132 and converted to a command by speech-to-text synthesis and speech recognition, a button press on a remote control device or other input device 142, or a gesture detected by the wrist sensor 126, by processing images captured by the camera 136 of the user's arm and hand using the computer vision system to identify a gesture performed by the user and to determine whether the identified gesture is an activation gesture. For example, the VUI may be invoked in response to detection of a specific hand gesture or hand orientation, such as a hand anchored perpendicular for a threshold duration. The manner of activating or invoking the VUI screen is outside the scope of the present disclosure.

At operation 604, the processor 104 determines a spatial location 204 for the elbow of the arm 202 of the user and a spatial location 206 for the wrist of the arm 202 based on signals received from the wrist sensor 124 and the elbow sensor 126.

At operation 608, the processor 104 determines a three-dimensional arm vector 208 extending from the spatial location 204 of the elbow to the spatial location 206 of the wrist.

At operation 710, the processor 104 determines a VUI element in the VUI screen corresponding to the three-dimensional arm vector 208 based on a predetermined 3D spatial mapping between three-dimensional arm vectors and VUI elements for the VUI screen. In some examples, the 3D spatial mapping may map each three-dimensional arm vector in a plurality of three-dimensional arm vectors to range of forward inclination angles and lateral inclination angles. In such examples, the operation 710 may comprise a number of sub-operations based on analysing the forward inclination angle and lateral inclination angle of the determined three-dimensional arm vector, as described below. Alternatively, a VUI element in the VUI screen may be based on an elbow-anchored arm gesture, for example defined by a trajectory over k past historical locations, rather than a single three-dimensional arm vector.

At operation 712, the processor 104 determines a forward inclination angle 212 formed between the three-dimensional arm vector 208 and a horizontal reference plane 210 defined by the XZ plane. At operation 714, the processor 104 determines a lateral inclination angle formed between the three-dimensional arm vector 208 and a vertical reference plane 210. At operation 716, the processor 104 determines a VUI element in the VUI screen based on the forward inclination angle formed between the three-dimensional arm vector 208 and a horizontal reference plane 210 defined by the XZ plane and the lateral inclination angle formed between the three-dimensional arm vector 208 and a vertical reference plane 210. In the present example, the operation 716 comprises sub-operations 718 and 720 based on analysing the forward inclination angle and lateral inclination angle of the determined three-dimensional arm vector. At operation 718, the processor 104 determines a corresponding level of the VUI screen among the plurality of levels of the VUI screen based on the forward inclination angle. Alternatively, the processor 104 may determine the corresponding level of the VUI screen among the plurality of levels of the VUI screen based on a vertical height of the three-dimensional arm vector. At operation 720, the processor 104 determines a corresponding VUI element in the determined VUI level of the VUI screen based on the lateral inclination angle. Alternatively, the processor 104 may determine the corresponding VUI element in the determined VUI level of the VUI screen based on a lateral distance of the three-dimensional arm vector from the YZ plane. It will be appreciated that the forward inclination angle 212 typically controls the VUI element level that is selected, and that the lateral inclination angle typically controls the VUI element on the VUI element level that is selected.

FIG. 9 is a schematic representation illustrating the relationship between the forward inclination angle and VUI element level in accordance with embodiments of the present disclosure. Each VUI element level in a VUI screen may be associated with a range of angle values. Range may be the same for each VUI element level in the VUI screen. Using FIG. 9 as an example, each VUI element level may have a range of angle values spanning 18 degrees (90 degrees divided by 5) so that a forward inclination angle of between 0 and 18 degrees corresponds to VUI element level 1, a forward inclination angle of between 19 and 36 degrees corresponds to VUI element level 2, a forward inclination angle of between 37 and 54 degrees corresponds to VUI element level 3, a forward inclination angle of between 55 and 72 degrees corresponds to VUI element level 1, and a forward inclination angle of between 73 and 90 degrees corresponds to VUI element level 5.

At operation 722, in response to determining the corresponding VUI element in the determined VUI level of the VUI screen, the determined VUI element is selected by the processor 104 as the current or active VUI element. As noted below, separate confirmation input is required to perform an executable action associated with the selected VUI element. The use of separate confirmation input provides a form of VUI locking that inhibits accidentally/unintentionally changing the VUI element level when performing further elbow-anchored arm gestures with lateral movements. Depending on the VUI screen configuration, this may be omitted.

The selection-based VUI locking may be performed automatically when the user performs a lateral motion at a VUI element level from a center or initial position. The selection-based VUI locking does not require an activation gesture. The selection-based locking mechanism may only be provided when there are multiple items at a given VUI element level. If there are only two VUI elements per VUI element level, for example with one each side of the user's arm, crossing the centerline be used to select a VUI element and execute the executable action associated with selected VUI element without the visually emphasizing the selected VUI element and providing confirmation input regarding the same. However, if there are multiple VUI elements on each side of the centerline at given VUI element level, crossing to select or focus on the VUI element and confirmation input, such as a hand gesture, is typically used to select the VUI element and execute the executable action associated with it.

At operation 724, in response to selecting the determined VUI element as the current or active VUI element, the processor 104 causes the selected VUI element to be visually emphasized to provide feedback to the user. The visual emphasis enhances the determined VUI element, thereby distinguishing the determined VUI element from the remainder of the VUI elements in the VUI screen. The visual emphasis by be caused by changing a color of the determined VUI element, the size of the determined VUI element (e.g., enlarging the determined VUI element), or focusing the determined VUI element with onscreen indicator such as a caret, cursor, halo or pointer. Audio feedback in the form of a designated sound or tone or may also be provided to the user when a VUI element is selected.

Figure 8A:
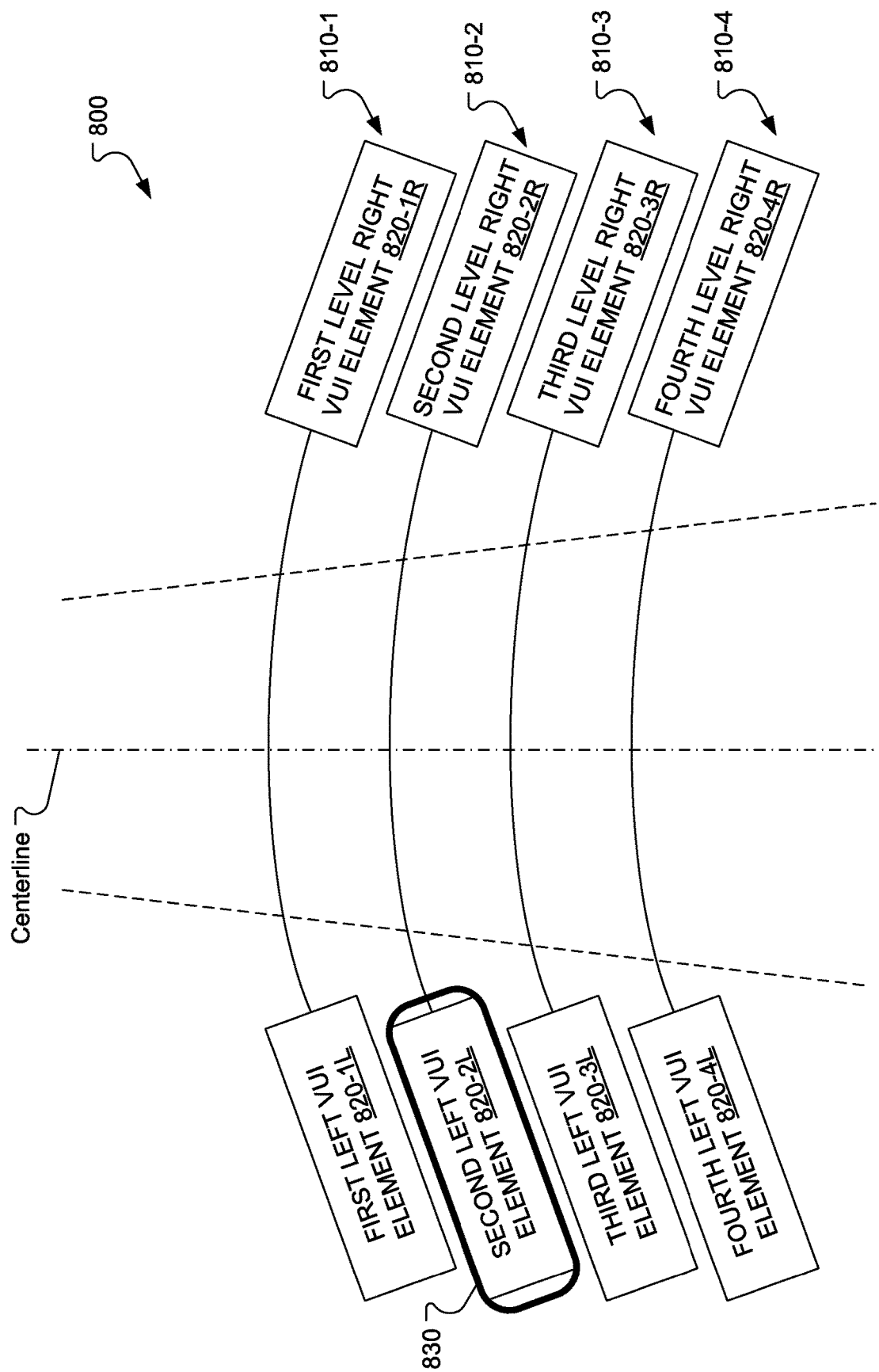
FIGS. 8A-8D illustrate visual user interface screens in accordance with embodiments of the present disclosure.

Reference will be briefly made to FIG. 8A, which illustrates one embodiment of a VUI screen 800 displayed on the display 138 of the computing device 102 in accordance with the present disclosure. The VUI screen 800 comprises a plurality of VUI elements. The VUI screen 800 comprises four levels of VUI elements denoted 810-1, 810-2, 810-3 and 810-4, respectively. Each VUI element levels includes two VUI elements: a left side and right side VUI element spatially associated with the left and right sides of the VUI screen 800, respectively. The first VUI element level 820-1 comprises a first left VUI element 820-1L and a first right VUI element 820-1R. The second VUI element level 820-2 comprises a second left VUI element 820-2L and a second right VUI element 820-2R. The third VUI element level 820-3 comprises a third left VUI element 820-3L and a third right VUI element 820-3R. The fourth VUI element level 820-4 comprises a third left VUI element 820-4L and a third right VUI element 820-4R. In the shown example, the second left VUI element 810-2L is visually emphasized by an onscreen indicator 830. The VUI element levels are given ordinals (first, second, third, fourth) only to distinguish the levels from each other rather than to define an order. It may be assumed that the user's arm begins at a given interaction at rest and that the first VUI element that is selected by the user and visually emphasized in the given interaction may be different than the second left VUI element 810-2L, and may depend on the speed of the user's movements and the responsiveness to the computing device 102 in detecting gestures.

At operation 726, the processor 104 determines whether confirmation input to perform an executable action associated with the selected VUI element has been received/detected.

When the processor 104 determines that confirmation input to perform an executable action associated with the selected VUI element has been received/detected, operations proceed to operation 728 at which the processor 104 causes the executable action corresponding to the selected VIU element to be performed. The confirmation input may be any suitable input such as a designated hand gesture identified by the computer vision system 122, voice input, or other input received via a button press of a remote control device or other input device 142 of the computing device 102. The designated hand gesture may be, for example, a pinch gesture in the form of a pinching action with the user's fingers, a closing of the user's palm or a "dwell" gesture in the form of maintaining the arm position at a given position (within tolerance) for a duration of time equal to, or greater than, a threshold duration.

When the processor 104 determines that confirmation input to perform an executable action associated with the selected VUI element has not been received/detected, operations proceed to operation 730 at which the processor 104 determines whether the three-dimensional arm vector has changed by an amount equal to, or greater than, a threshold amount. For example, the processor 104 may determine whether the forward angle or lateral inclination angle of the three-dimensional arm vector has changed by an amount equal to, or greater than, a threshold amount. It will be appreciated that operation 730 comprises operations similar to operations 604, 606 and 608 to determine a three-dimensional arm vector. The threshold amount may vary based on the previously determined three-dimensional arm vector. For example, the threshold amount may be smaller at upper VUI element levels of the VUI screen relative of a screen orientation of the VUI screen and larger forward inclination angles.

When the processor 104 determines that the three-dimensional arm vector 208 has changed by an amount equal to, or greater than, the threshold amount, operations return to operation 710 at which the processor 104 determines a new or changed VUI element in the VUI screen corresponding to the three-dimensional arm vector 208 based on the predetermined 3D spatial mapping.

When the processor 104 determines that the three-dimensional arm vector 208 has not changed by an amount equal to, or greater than, the threshold amount, operations return to operation 726.

Although not shown, the processor 104 monitors for and determines when the methods 600 and 700 are to be ended, for example, by receiving corresponding input to close the VUI screen displayed in operation 702.

In alternative embodiments, rather than selecting and visually emphasising the selected VUI element in operation 724, the processor 104 may cause the executable action corresponding to the three-dimensional arm vector 208 to be performed without selecting and visually emphasising the selected VUI element.

Figure 8B:
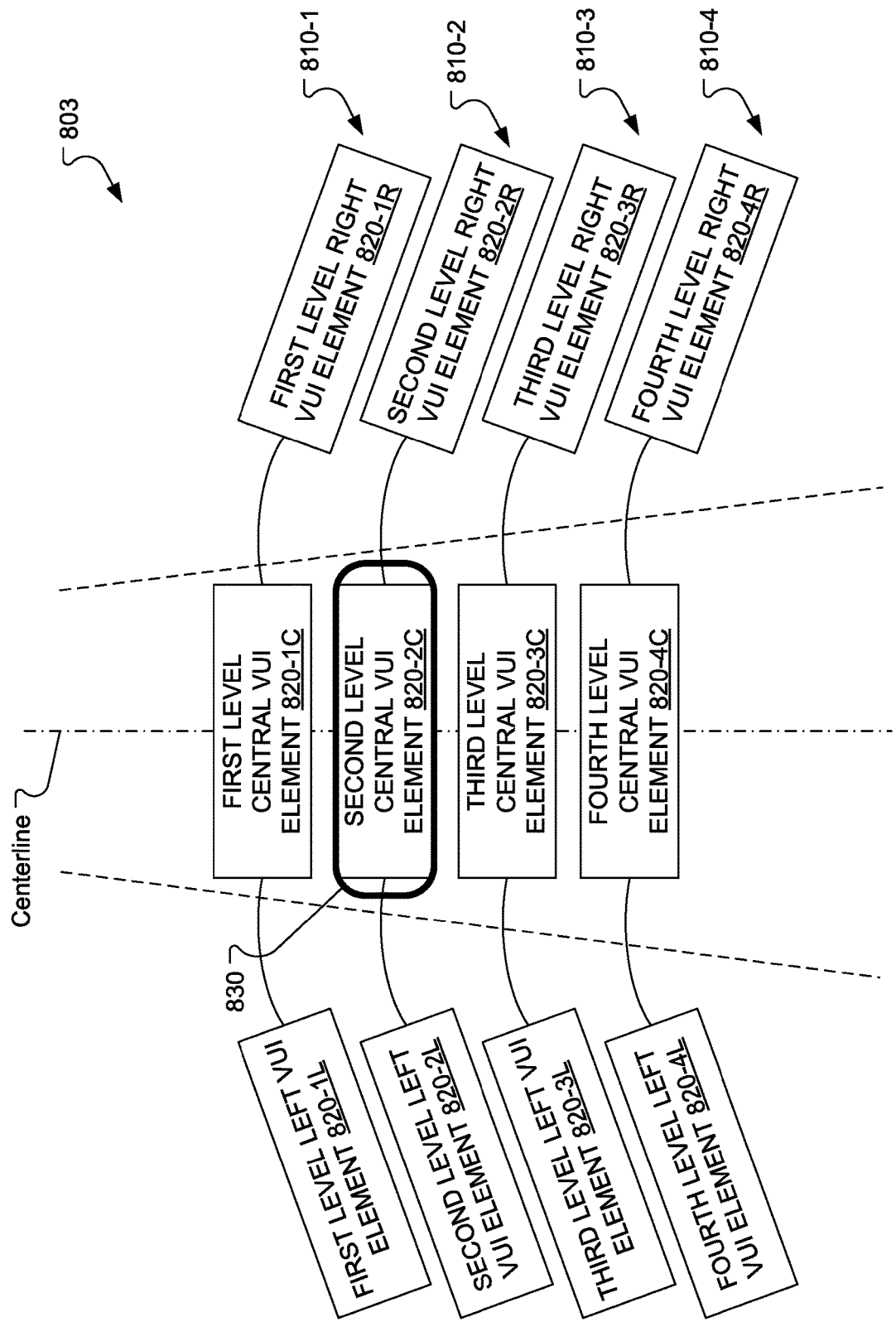

FIG. 8B illustrates an alternative VUI screen 803. The VUI screen 803 is similar to the VUI screen 800 in FIG. 8A except that each level of the VUI also includes a center VUI element in each level, identified individually as first central VUI element 820-1C, second central VUI element 820-2C, third central VUI element 820-3C and fourth central VUI element 820-4C.

Figure 8C:
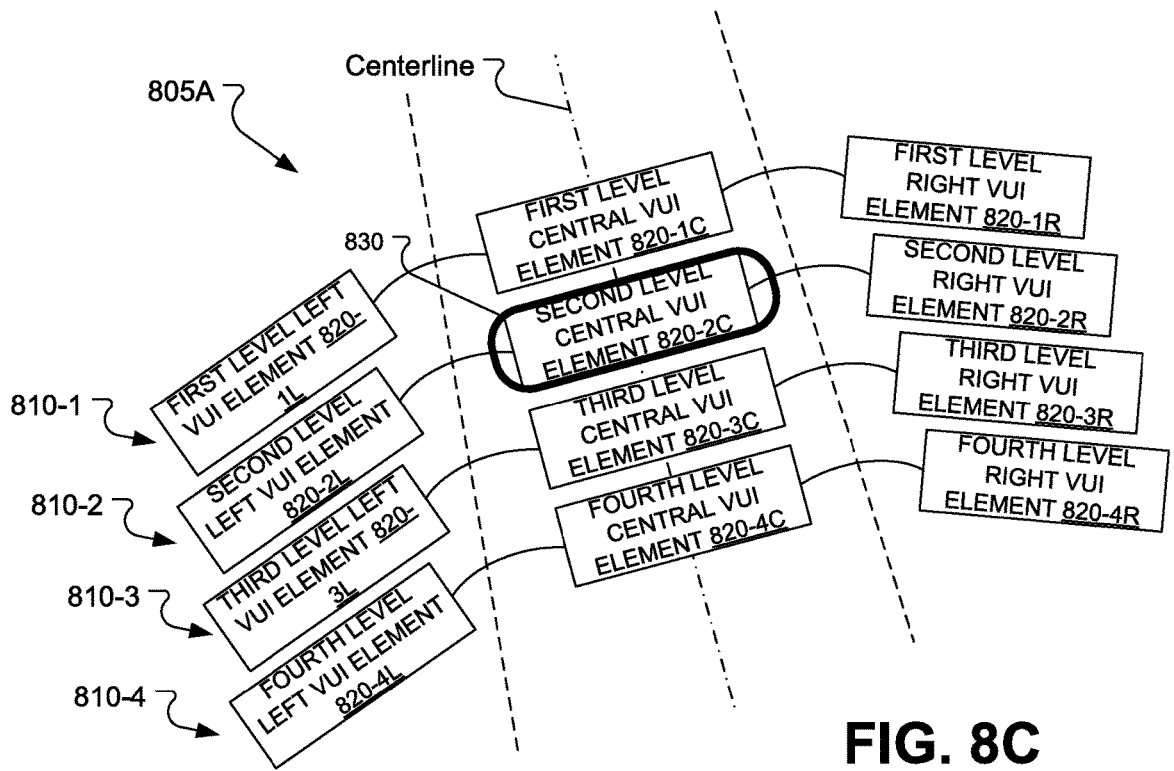
Figure 8D:
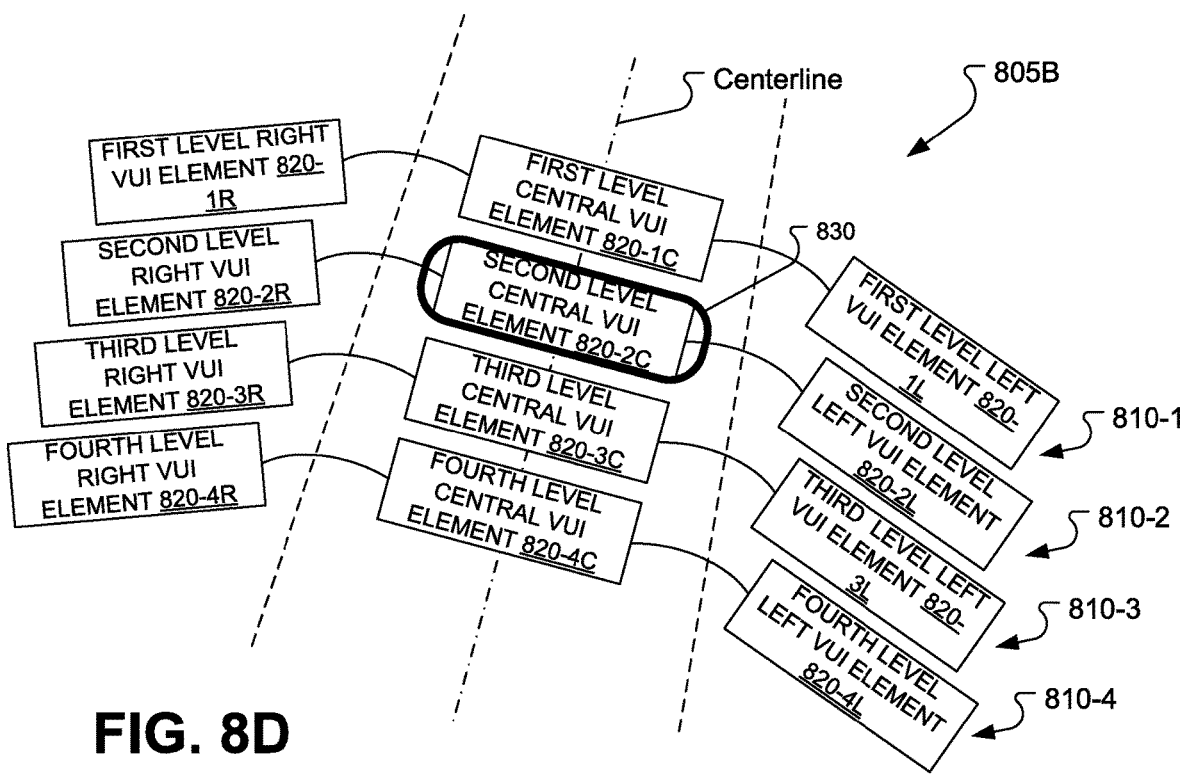

FIGS. 8C and 8D illustrates VUI screens 805A and 805B respectively. The VUI screens 805A and 805B are angled or tilted relative to the VUI screens 800 and 803 of FIGS. 8A and 8B. The three-dimensional arm vector 208 at the start of a given interaction has an offset angle greater than a threshold offset angle, an angled or tilted VUI screen may be displayed. This is an optional feature. A determination as to whether the three-dimensional arm vector 208 has an offset angle greater than or equal to a threshold offset angle is made by the processor 104 at the start of an interaction, before the VUI screen is displayed in operation 702. The threshold offset angle may be 5 degrees, 10 degrees or 15 degrees in some examples. FIG. 8C illustrates a VUI screen titled to the left whereas FIG. 8D illustrates a VUI screen titled to the right. An identification of arm used by the active (or current) user may be predetermined and stored in the settings in the memory 112 of the computing device 102.

Alternatively, a preliminary determination of the arm being used by the active user may be made by the processor 104 before the determination as to whether the three-dimensional arm vector 208 has an offset angle greater than the threshold offset angle.

The offset angle may be measured between the three-dimensional arm vector and a vertical centerline from the spatial location of the elbow. An orientation or tilt angle (e.g., amount of tilt) of the VUI screen may be dynamically determined and the layout of the VUI screen determined based on the angularly difference between the three-dimensional arm vector 208 and reference. The use of angled or tilted VUI screens based on an initial elbow angle allows the VUI to adapt to the available interaction space of the user's elbow and accommodates a plurality of different user arm positions, for example, while the user is seated.

It will be appreciated that a user has more control over the lateral inclination angle when the forward inclination angle is small and vice versa. Accordingly, upper levels of the VUI screens relative to a screen orientation of the VUI may have smaller interaction space as compared to the lower levels of the VUI screens relative to a screen orientation of the VUI based on the biomechanical and ergonomic aspects. Thus, to accommodate the available interaction space, upper VUI levels may have fewer VUI elements requiring less horizontal motion as compared to the lower levels. This also helps reduce the false positives due to the natural arm movement. A pyramidal VUI configuration accommodates such biomechanical aspects. Alternatively, the number of VUI elements may remain the same but the mapping is adapted such that a different range of motion (or angular range for the three-dimensional arm vector) at each VUI element level is matched to same number of VUI elements.

Figure 10:
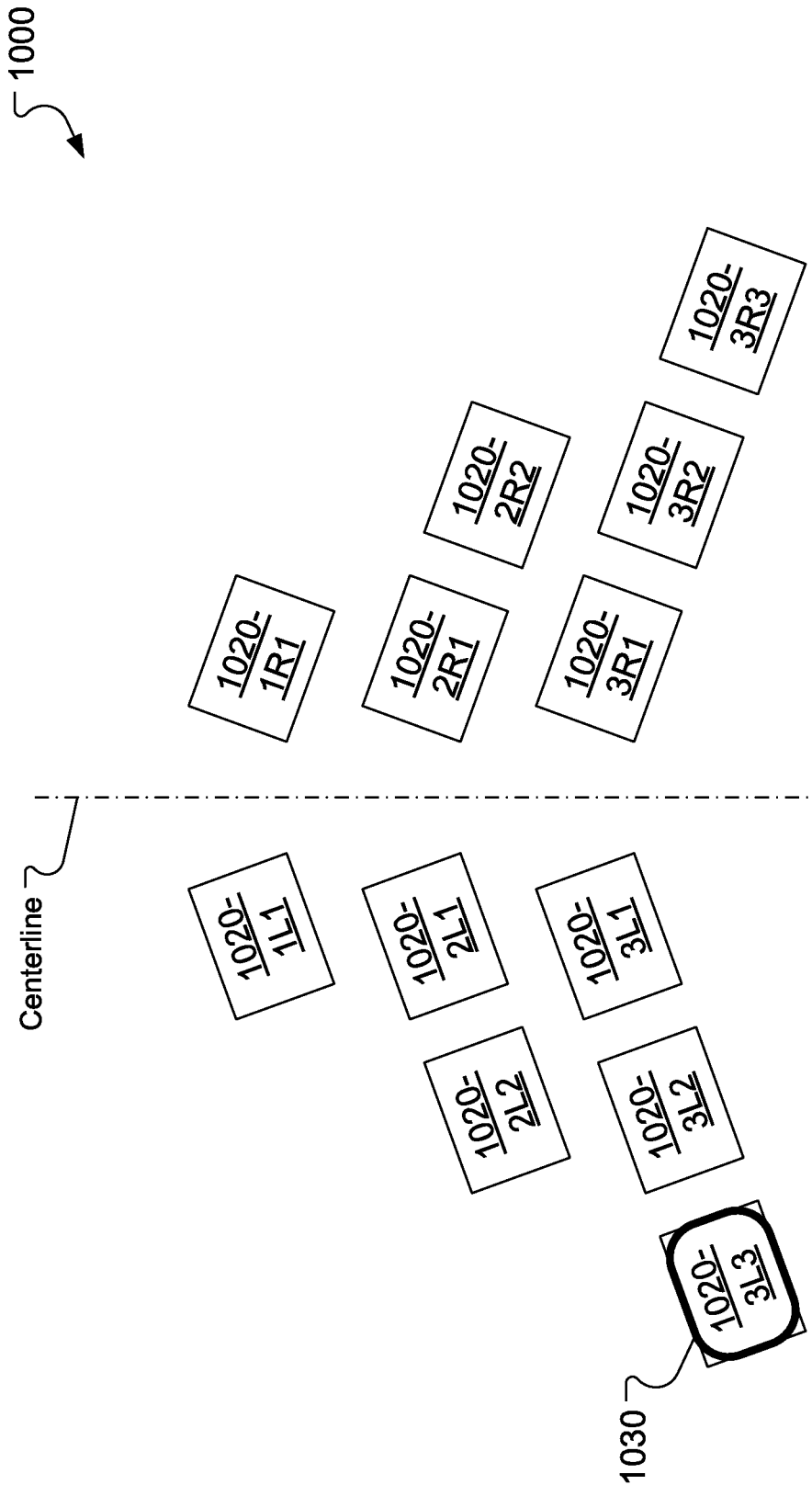
FIG. 10 illustrates a visual user interface screen in accordance with another embodiment of the present disclosure.

FIG. 10 illustrates a visual user interface screen 1000 in accordance with another embodiment of the present disclosure having a three-level pyramidal configuration. The top level has a left VUI element 1020-1L1 and a right VUI element 1020-1R1. The middle level has two left VUI elements 1020-2L1, 1020-2L2 and two right VUI elements 1020-2R1, 1020-2R2. The bottom level has three left VUI elements 1020-3L1, 1020-3L2, 1020-3L3 and three right VUI elements 1020-3R1, 1020-3R2, 1020-3R3. The onscreen selection indicator is indicated by reference 1030.

Figure 11:
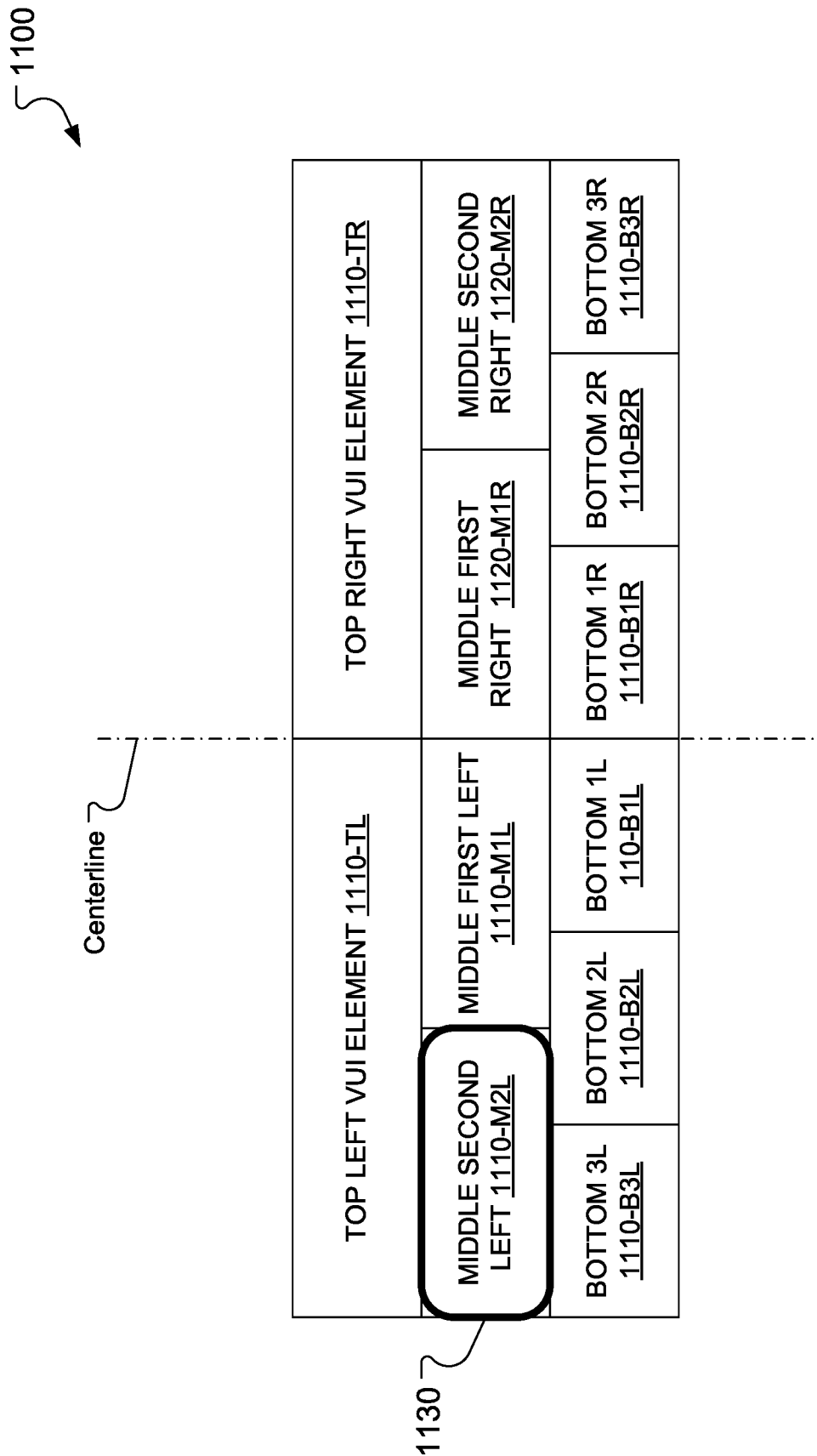
FIG. 11 illustrates a visual user interface screen in accordance with a further embodiment of the present disclosure.

FIG. 11 illustrates a visual user interface screen 1100 in accordance with a further embodiment of the present disclosure. The visual user interface screen 1100 provides a three-level pyramidal configuration of different granularity. A top level includes a top left user interface 1110-TL and a top right user interface 1110-TR. A middle level includes, on a left side, a middle first left user interface 1110-M1L and a middle second left user interface 1110-M2L, and on a right side, a middle first right user interface 1110-M1R and a middle second right user interface 1110-M2R. A bottom level includes, on a left side, a bottom first left user interface 1110-B1L, a bottom second left user interface 1110-B2L and a bottom third left user interface 1110-B3L, and on a right side, a bottom first right user interface 1110-B1R, a bottom second right user interface 1110-B2R and a bottom third right user interface 1110-B3R. The onscreen selection indicator is indicated by reference 1130.

Figure 12:
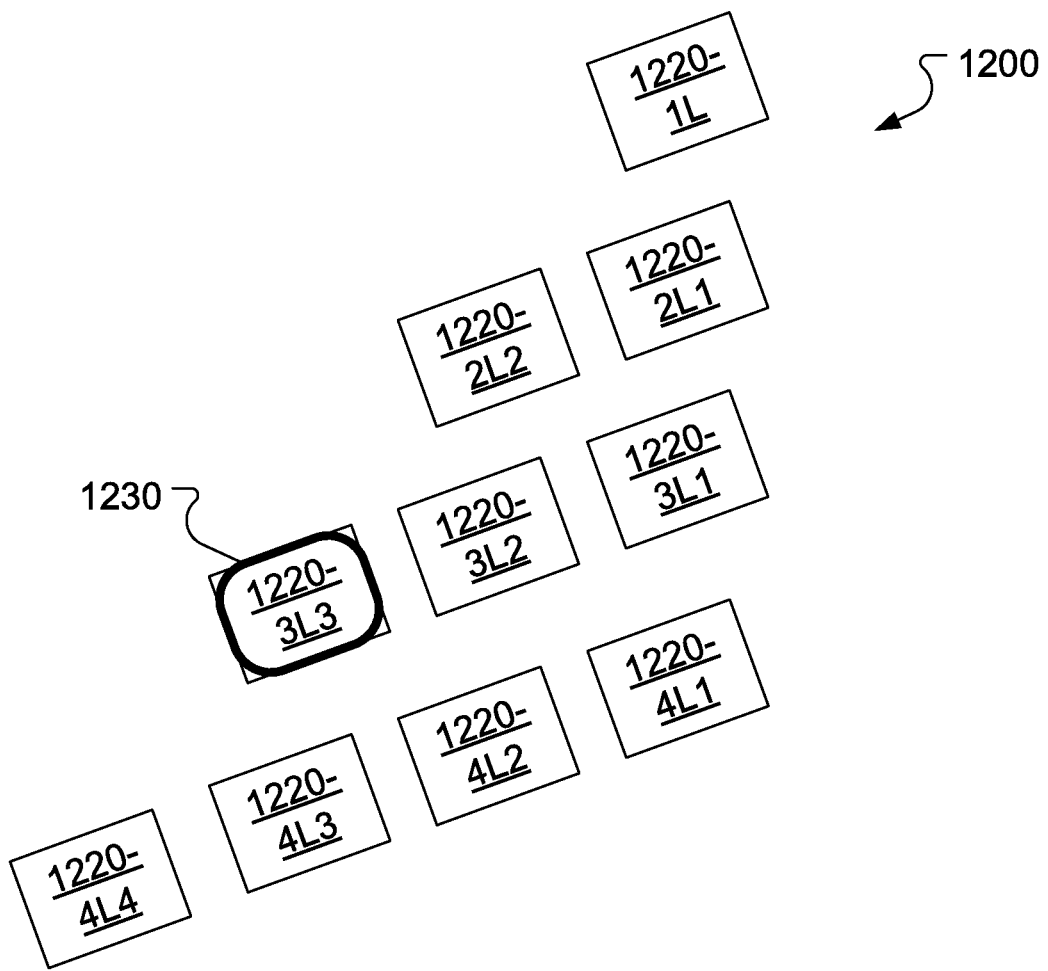
FIG. 12 illustrates a visual user interface screen in accordance with a further embodiment of the present disclosure.

FIG. 12 illustrates a visual user interface screen 1200 in accordance with another embodiment of the present disclosure. The VUI screen 1200 is a asymmetrical and accommodate asymmetries that are known to be latent in arm movements. Elbow muscle allows a wide range of inward movement, therefore a VUI screen may be asymmetrical with more VUI elements on the inner side in contrast to outward (away from body). In other words, forearm side of the VUI screen may be configured to have more VUI elements as a result of increased interaction space compared to the upper arm side. The top level has a VUI element 1220-1L. The second level has two VUI elements 1220-2L1, 1220-2L2. The third level has three VUI elements 1220-3L1, 1220-3L2, 1220-3L3. The fourth and bottom level has four VUI elements 1220-4L1, 1220-4L2, 1220-4L3 and 1220-4L3. The onscreen selection indicator is indicated by reference 1230. To inhibit the false selection when the user brings their down hand back to the rest position, a locking mechanism may be used which does not allow the VUI level to be changed while a VUI element is selected as described above.

Figure 13A:
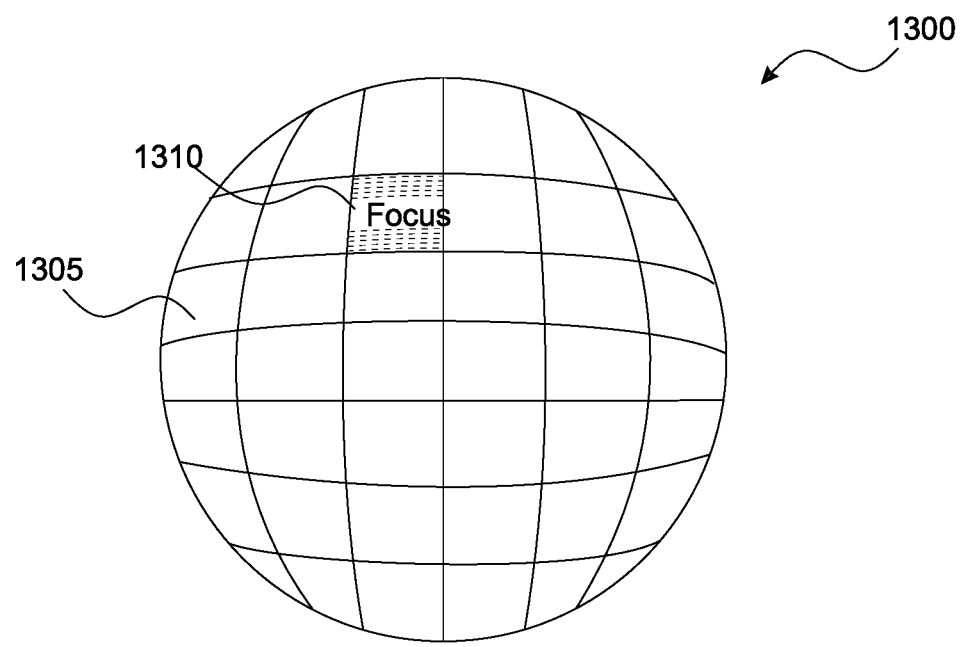
FIG. 13A illustrates a spherical visual user interface in accordance with one embodiment of the present disclosure.

FIG. 13A illustrates a spherical visual user interface 1300 having in accordance with one embodiment of the present disclosure. The spherical visual user interface 1300 may be provided as part of a VUI screen that may be used in combination with the methods of the present disclosure. The spherical visual user interface 1300 comprises a sphere or ellipsoid in which the surface is divided into a plurality of VUI elements referred to by the reference number 1305, providing a spherical or ellipsoidal grid. The VUI elements may be equally sized or differentially sized depending on the embodiment. The VUI elements may be any shape projected onto a sphere such as squares, rectangles, trap, hexagon or circles. A VUI element 1305 in the spherical visual user interface 1300 may be selected using arm gestures, based on a three-dimensional arm vector, as described above. The currently selected VUI element, as referred to as the "focus", may be visually emphasized by an onscreen selection indicator 1310. A position, orientation and zoom level of the spherical visual user interface 1300 may be adjusted by pan, rotation and zoom operations, which are be performed in response to detection of corresponding input, such as a designated hand gesture detected by the computer vision system 122, voice input, or other input received via a button press of a remote control device or other input device 142 of the computing device 102. The spherical visual user interface 1300 may have an infinite radius, which would make the VUI a flat surface, similar to a rectangular VUI.

An executable action associated with the selected VUI element may be caused to be performed by confirmation input. The confirmation input may be any suitable input such as a designated hand gesture detected by the computer vision system 122, voice input, or other input received via a button press of a remote control device or other input device 142 of the computing device 102. The designated hand gesture may be, for example, a pinch gesture in the form of a pinching action with the user's fingers, a closing of the user's palm or a "dwell" gesture in the form of maintaining the arm position at a given position (within tolerance) for a duration of time equal to, or greater than, a threshold duration.

Figure 13B:
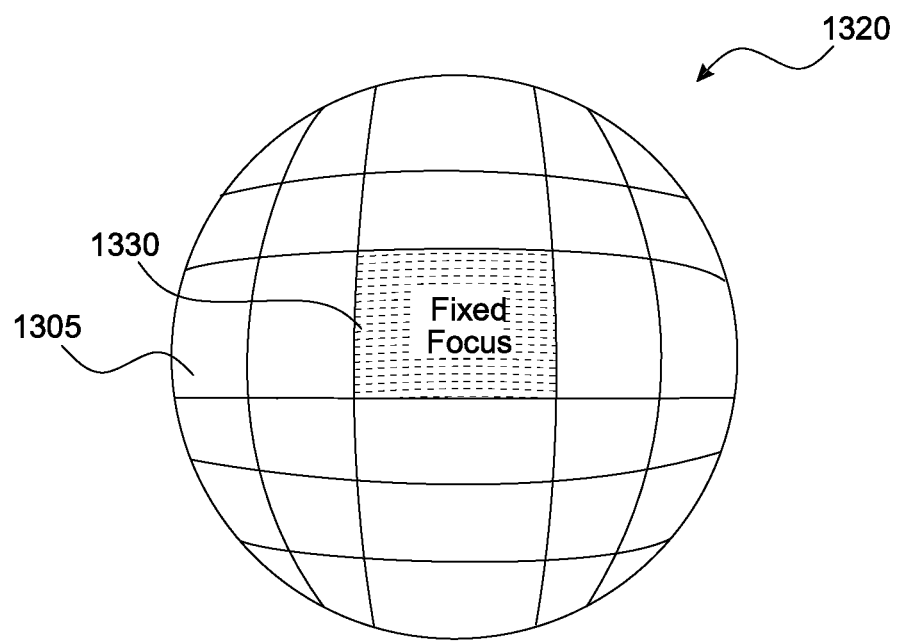
FIG. 13B illustrates a spherical visual user interface in accordance with another embodiment of the present disclosure.
Figure 14:
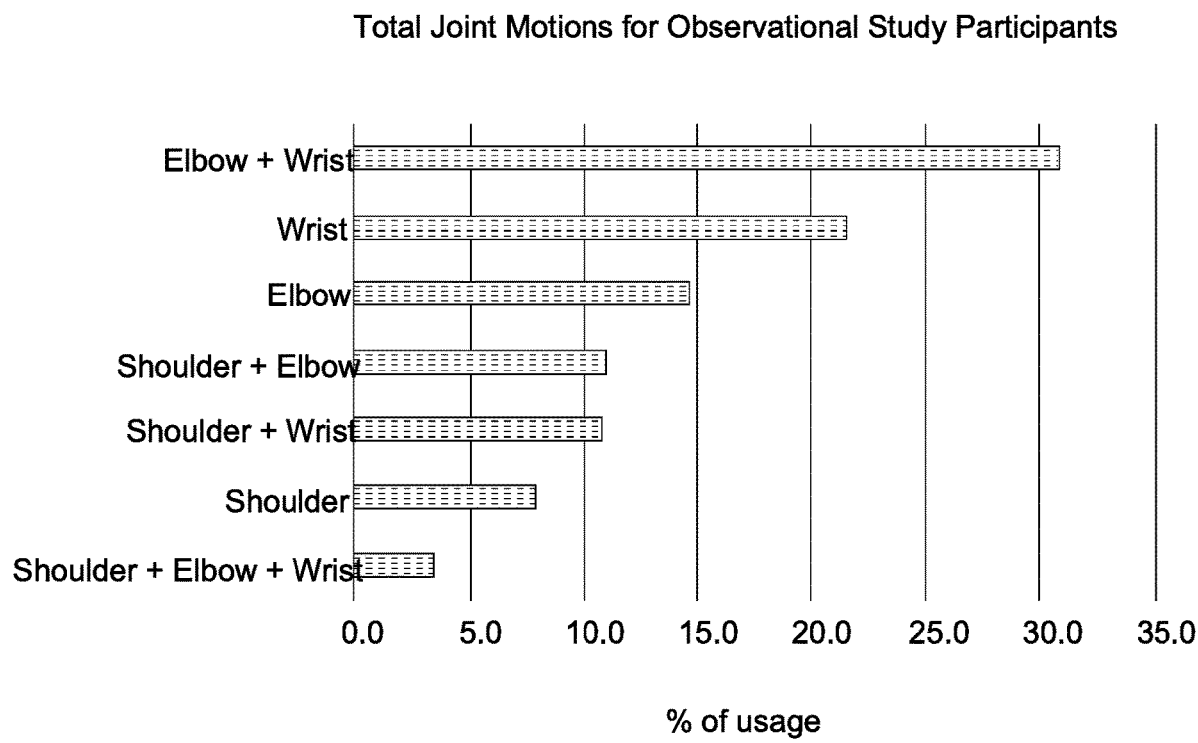
FIG. 14 is a table demonstrating the results of an observational study on the joint motions preferred by users when given free choice to perform arm gestures.

FIG. 13B illustrates a spherical visual user interface 1320 having in accordance with another embodiment of the present disclosure. The spherical visual user interface 1320 is similar to the spherical visual user interface 1300 except that the position of the "focus" or onscreen selection indicator 1330, is fixed. The currently selected VUI element or "focus", may be changed by rotating the spherical visual user interface 1320 using arm gestures, which may be based on rotations of the three-dimensional arm vector 208, causing additional content to be revealed. An executable action associated with the selected VUI element may be caused to be performed by confirmation input similar to the spherical VUI 1300 described above.

The spherical VUIs 1300 and 1320 may be suitable used for any kind of grid-like UIs such as galleries used in streaming media applications, or spherical/3D mapping applications.

The teachings of the present disclosure may be applied to smart TVs, smart speakers and other computing devices with which mid-air interactions are used, including virtual and augmented reality computing devices. The teachings of the present disclosure may be extended to user interfaces without a VUI, such as a purely motion based UI, with suitable adaption of the teachings of the present disclosure to accommodate for the lack of a dedicated display as the case may be.

General

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified, as appropriate.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present disclosure as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, central processing units (CPUs), neural processing units (NPUs), tensor processing units (TPUs), hardware accelerators, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of user interface control on a computing device based on elbow-anchored arm gestures, comprising:
    causing a visual user interface (VUI) screen to be displayed on a display of the computing device, wherein the VUI screen comprises a plurality of VUI elements arranged in a plurality of VUI element levels, each VUI element level comprising one or more VUI elements;
    determining, based on sensor data, a spatial location of an elbow of an arm of a user;
    determining, based on sensor data, a spatial location of a wrist of the arm of the user;
    determining a three-dimensional (3D) arm vector extending from the spatial location of the elbow to the spatial location of the wrist; and
    determining a VUI element in the VUI screen corresponding to the 3D arm vector based on a predetermined 3D spatial mapping between 3D arm vectors and VUI elements for the VUI screen.

2. The method of claim 1, wherein determining the VUI element in the VUI screen corresponding to the 3D arm vector comprises:
   determining a forward inclination angle formed between the 3D arm vector and a horizontal reference plane;
   determining a lateral inclination angle formed between the 3D arm vector and a vertical reference plane; and
   determining a VUI element in the VUI screen based on the forward inclination angle and the lateral inclination angle.

3. The method of claim 2, wherein determining the VUI element in the VUI screen comprises:
   determining a corresponding VUI element level of the VUI screen among the plurality of VUI element levels of the VUI screen based on the forward inclination angle; and
   determining a corresponding VUI element in the determined VUI element level of the VUI screen based on the lateral inclination angle.

4. The method of claim 1, further comprising:
   prior to causing the VUI screen to be displayed:
      in response to input to display the VUI screen:
         determining a spatial location of an elbow of an arm of a user;
         determining a spatial location of a wrist of the arm of the user;
         determining a 3D arm vector extending from the spatial location of the elbow to the spatial location of the wrist;
         determining an offset angle between the 3D arm vector and a vertical centerline from the spatial location of the elbow; and
         generating the VUI screen offset from the centerline of the display of the computing device in response to a determination that the offset angle is greater than or equal to a threshold offset angle.

5. The method of claim 1, wherein upper VUI element levels in VUI screen relative to a screen orientation of the VUI screen have fewer VUI elements than lower VUI element levels in VUI screen relative to a screen orientation of the VUI screen.

6. The method of claim 1, wherein the plurality of VUI elements are arranged in spherical grid.

7. The method of claim 1, further comprising:
   selecting the determined VUI element; and
   visually emphasizing the selected VUI element.

8. The method of claim 7, further comprising:
   performing an executable action corresponding to the selected VUI element in response to the detection of confirmation input.

9. The method of claim 8, wherein the confirmation input is a designated hand gesture.

10. The method of claim 1, further comprising:
    performing an executable action corresponding to the determined VUI element.

11. A computing device, comprising:
    a display;
    a processor coupled the display, wherein the processor is configured to:
       cause a visual user interface (VUI) screen to be displayed on the display, wherein the VUI screen comprises a plurality of VUI elements arranged in a plurality of VUI element levels, each VUI element level comprising one or more VUI elements;
       determine, based on sensor data, a spatial location of an elbow of an arm of a user based on sensor data;
       determine, based on sensor data, a spatial location of a wrist of the arm of the user;
       determine a three-dimensional (3D) arm vector extending from the spatial location of the elbow to the spatial location of the wrist; and
       determine a VUI element in the VUI screen corresponding to the 3D arm vector based on a predetermined 3D spatial mapping between 3D arm vectors and VUI elements for the VUI screen.

12. The computing device of claim 11, wherein the processor is configured to determine the VUI element in the VUI screen corresponding to the 3D arm vector by:
    determining a forward inclination angle formed between the 3D arm vector and a horizontal reference plane;
    determining a lateral inclination angle formed between the 3D arm vector and a vertical reference plane; and
    determining a VUI element in the VUI screen based on the forward inclination angle and the lateral inclination angle.

13. The computing device of claim 12, wherein the processor is configured to determine the VUI element in the VUI screen by:
    determining a corresponding VUI element level of the VUI screen among the plurality of VUI element levels of the VUI screen based on the forward inclination angle; and
    determining a corresponding VUI element in the determined VUI element level of the VUI screen based on the lateral inclination angle.

14. The computing device of claim 11, wherein the processor is further configured to:
    prior to causing the VUI screen to be displayed:
       in response to input to display the VUI screen:
          determine a spatial location of an elbow of an arm of a user;
          determine a spatial location of a wrist of the arm of the user;
          determine a 3D arm vector extending from the spatial location of the elbow to the spatial location of the wrist;
          determine an offset angle between the 3D arm vector and a vertical centerline from the spatial location of the elbow; and
          generate the VUI screen offset from the centerline of the display of the computing device in response to a determination that the offset angle is greater than or equal to a threshold offset angle.

15. The computing device of claim 11, wherein upper VUI element levels in VUI screen relative to a screen orientation of the VUI screen have fewer VUI elements than lower VUI element levels in VUI screen relative to a screen orientation of the VUI screen.

16. The computing device of claim 11, wherein the plurality of VUI elements are arranged in spherical grid.

17. The computing device of claim 11, wherein the processor is further configured to:
    select the determined VUI element; and
    visually emphasize the selected VUI element.

18. The computing device of claim 11, wherein the processor is further configured to:
    perform an executable action corresponding to the selected VUI element in response to the detection of confirmation input.

19. The computing device of claim 11, wherein the processor is further configured to:
    perform an executable action corresponding to the determined VUI element.

20. A non-transitory machine-readable medium having tangibly stored thereon executable instructions that, in response to execution by a processor of a computing device, cause the processor to:
- cause a visual user interface (VUI) screen to be displayed on a display of the computing device, wherein the VUI screen comprises a plurality of VUI elements arranged in a plurality of VUI element levels, each VUI element level comprising one or more VUI elements;
- determine, based on sensor data, a spatial location of an elbow of an arm of a user;
- determine, based on sensor data, a spatial location of a wrist of the arm of the user;
- determine a three-dimensional (3D) arm vector extending from the spatial location of the elbow to the spatial location of the wrist; and
- determine a VUI element in the VUI screen corresponding to the 3D arm vector based on a predetermined 3D spatial mapping between 3D arm vectors and VUI elements for the VUI screen.

* * * * *